(12) United States Patent
Terada

(10) Patent No.: US 8,054,913 B2
(45) Date of Patent: Nov. 8, 2011

(54) RECEIVER

(75) Inventor: Takahide Terada, Nishitokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1151 days.

(21) Appl. No.: 11/777,780

(22) Filed: Jul. 13, 2007

(65) Prior Publication Data
US 2008/0069183 A1 Mar. 20, 2008

(30) Foreign Application Priority Data

Sep. 14, 2006 (JP) ................................. 2006-248799

(51) Int. Cl.
*H04L 27/00* (2006.01)
(52) U.S. Cl. ...................................... 375/316; 375/137
(58) Field of Classification Search .................. 375/137, 375/316, 343, 345, 324, 340; 455/130, 234.1, 455/574
See application file for complete search history.

(56) References Cited

U.S. PATENT DOCUMENTS

| | | | |
|---|---|---|---|
| 5,926,750 A * | 7/1999 | Ishii | 455/130 |
| 5,974,038 A | 10/1999 | Shou et al. | |
| 5,999,830 A * | 12/1999 | Taniguchi et al. | 455/574 |
| 6,760,579 B1 | 7/2004 | Yokoyama et al. | |
| 6,771,720 B1 * | 8/2004 | Yang et al. | 375/345 |
| 7,664,163 B2 * | 2/2010 | Nakagawa et al. | 375/147 |
| 2002/0061081 A1 * | 5/2002 | Richards et al. | 375/346 |
| 2003/0157912 A1 * | 8/2003 | Atkinson et al. | 455/234.1 |
| 2005/0078734 A1 * | 4/2005 | Baker et al. | 375/130 |
| 2005/0213635 A1 | 9/2005 | Terada et al. | |
| 2007/0147475 A1 * | 6/2007 | Yamamoto | 375/130 |
| 2008/0039042 A1 * | 2/2008 | Ciccarelli et al. | 455/234.1 |
| 2008/0267324 A1 * | 10/2008 | Mimura et al. | 375/343 |

FOREIGN PATENT DOCUMENTS

| | | |
|---|---|---|
| JP | 9-321667 A | 12/1997 |
| JP | 2000-165963 A | 6/2000 |
| JP | 2005-217899 A | 8/2005 |

OTHER PUBLICATIONS

L. Stoica et al., "An Ultraband System Architecture for Tag Based Wireless Sensor Networks," IEEE Transactions on Vehicular Technology, vol. 54, No. 5, Sep. 2005, pp. 1632-1645.
L. Stoica et al., A Low-Complexity Noncoherent IR-UWB Transceiver Architecture With TOA Estimation, IEEE Transactions on Microwave Theory and Techniques, vol. 54, No. 4, Apr. 2006, pp. 1637-1646.
M. Horiguchi et al., "Switched-Source-Impedance CMOS Circuit for Low Standby Subthreshold Current Giga-Scale LSI's," IEEE Journal of Solid-State Circuits, vol. 28, No. 11, Nov. 1993, pp. 1131-1135.

* cited by examiner

*Primary Examiner* — Shuwang Liu
*Assistant Examiner* — Helene Tayong
(74) *Attorney, Agent, or Firm* — Miles & Stockbridge P.C.

(57) ABSTRACT

Power switches of circuits at respective stages of a low noise amplifier, demodulators, low-pass filers, variable gain amplifiers, and analog-to-digital converters are controlled to be off by an operation control unit in a non-reception period of an impulse signal. An increase in power consumption due to the adoption of an active filter or a variable gain amplifier is compensated for by a reduction in power consumption through intermittent operations of the circuits at the respective stages according to on and off control of the power switches.

17 Claims, 12 Drawing Sheets

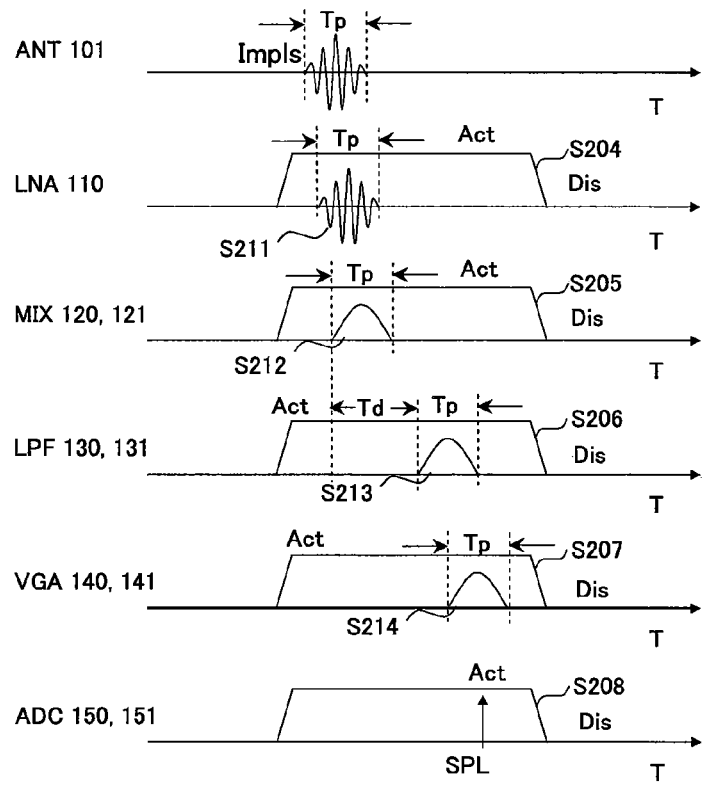
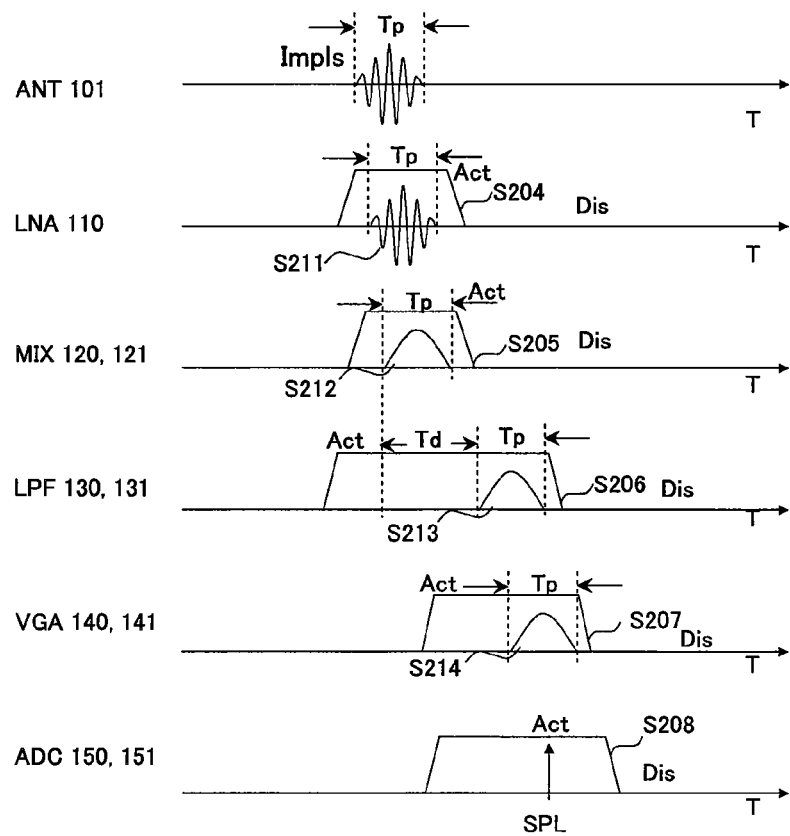

RECEIVER

CLAIM OF PRIORITY

The present application claims priority from Japanese application JP 2006-248799 filed on Sep. 14, 2006, the content of which is hereby incorporated by reference into this application.

FIELD OF THE INVENTION

The present invention relates to a receiver of a communication system that uses an impulse signal, and, more particularly to a technique effective for an intermittent operation for reducing power consumption of the receiver.

BACKGROUND OF THE INVENTION

An ultra wide band (UWB) radio communication system has been known which realizes power consumption and cost lower than those of radio communication systems that modulate continuous carriers and perform communication such as a cellular phone and a wireless LAN.

The UWB radio communication system is a radio communication system that discretely transmits and receives impulse signals and performs communication without using continuous carriers unlike the cellular phone. Since frequency spectra of the impulse signals are distributed in a wide band, the UWB radio communication is called Ultra Wide Band Impulse Radio (UWB-IR) communication and attracts attention as a radio communication system adoptable in a low-power sensor net system. The UWB-IR radio communication system adoptable in the low-power sensor net system is described in, for example, Lucian Stoica et al, "An Ultrawideband System Architecture for Tag Base Wireless Sensor Networks", IEEE TRANSACTIONS ON VEHICULAR TECHNOLOGY, VOL. 54, No. 5, SEPTEMBER 2005, PP. 1632-1645 (hereinafter referred to as Non-Patent Document 1) and Lucian Stoica et al, "A Low-Complexity Noncoherent IR-UWB Transceiver Architecture With TOA Estimation", IEEE TRANSACTIONS ON MICROWAVE THEORY AND TECHNOLOGY, VOL. 54, No. 4, APRIL 2006, PP. 1637-1646.

In the UWB-IR radio communication system, for example, a time width of an impulse signal is about 2 nano-seconds and an interval between impulse signals is about 30 nano-seconds. As a result, as described above, frequency spectra of impulse signals discretely transmitted are distributed in a wide band. In this way, since the impulse signal of the UWB-IR radio communication system has signal components in a wide frequency band, a receiver for the UWB-IR radio communication system needs to perform operations necessary in the wide frequency band. A frequency band of the Wideband Code-Division Multiple Access (WCDMA) radio communication presently used in cellular phones widely is about 5 MHz. On the other hand, a frequency band of the UWB-IR radio communication is about 500 MHz or more, which is about 100 times as wide as that of the UWB-IR radio communication. In general, as a frequency band in which an RF circuit performs necessary operations is wider, power consumption is larger. However, since most of power supplies of radio communication apparatuses used in the sensor net system are batteries or built-in power supplies with low driving ability, it is desirable that power consumption of the radio communication apparatuses is small.

Therefore, JP-A-2005-217899 discloses a technique for reducing power consumption of a receiver for the UWB-RI radio communication system. In a method of reducing power consumption disclosed in JP-A-2005-217899, an operation of an amplifier called a low noise amplifier at a first stage of a UWB radio receiver is stopped when there is no reception signal.

JP-A-9-321667 discloses a technique for reducing power consumption during standby of a receiver of the code division multiple access (CDMA) communication system. In a method of reducing power consumption disclosed in JP-A-9-321667, a matched filter to which a baseband signal demodulated from a reception signal is supplied is driven only when it is possible to detect a peak of a correlation value with a power supply voltage control circuit at predetermined time intervals during standby.

In Masashi Horiguchi et al, "Switched-Source-Impedance CMOS Circuit For Low Standby Subthreshold Current Giga-Scale LSI's", IEEE TRANSACTIONS ON SOLID-STATE CIRCUITS, VOL. 28, No. 11, NOVEMBER 1993, PP. 1131-1135, in order to reduce a subthreshold current of a refined MOS transistor, a switch on a power supply side and a switch on a ground side that interrupt the subthreshold current are respectively connected to a power supply voltage side of CMOS inverters at a first stage and a third stage and a ground voltage side of CMOS inverters at a second stage and a fourth stage of CMOS inverter chains dependently connected in series.

SUMMARY OF THE INVENTION

However, the technique disclosed in JP-A-2005-217899 can cause the amplifier at the first stage to intermittently operate for a reduction in power consumption but cannot cause circuit blocks including a mixer circuit and subsequent circuits to intermittently operate. Since the receiver for the UWB-IR radio communication system include many circuits other than the amplifier at the first stage, a sufficient effect of the reduction in power consumption of the entire receiver is not realized by the technique disclosed in JP-A-2005-217899.

The technique disclosed in JP-A-9-321667 does not reduce power consumption at all for an RF receiving unit, a multiplier, and a low-pass filter constituted by analog circuits with large power consumption. Therefore, a sufficient effect of the reduction in power consumption of the entire receiver is not realized by the technique disclosed in JP-A-9-321667 either.

Moreover, prior to the present invention, the inventors examined, in order to reduce power consumption of the receiver for the UWB-IR radio communication, the application of the intermittent operation technique disclosed in JP-A-2005-217899 to a receiving circuit block at a post stage of the mixer circuit. In the receiver examined, a low noise amplifier is used as the amplifier at the first stage, a low-pass filter is used as the receiving circuit block at the post stage of the mixer circuit, and a variable gain amplifier is also used for coping with not only short distance communication but also medium distance communication and long distance communication. An operation period in the intermittent operation for reducing power consumption is set to begin immediately before an impulse to be received arrives and end immediately after completion of the arrival of the received impulse.

In the UWB-IR radio communication, a time width of an impulse signal is about 2 nano-seconds and an interval between impulse signals is about 30 nano-seconds. A frequency spectrum of the impulse signal is an ultra-high frequency band signal with a center frequency of about 4 GHz and a frequency bandwidth of about 500 MHz. It has been clarified by the examination by the inventors prior to the present invention that, for the receiver for the UWB-IR radio communication with a center frequency of about 4 GHz, an RF signal of the wireless LAN with a center frequency of about 5 GHz widely used recently is an interfering signal. In other words, in an output of the mixer of the receiver for the UWB-IR radio communication examined prior to the present invention, not only an analog baseband signal in a frequency band of about 500 MHz desired in the UWB-IR radio communication but also a spurious interfering signal of about 1 GHz due to interference of the RF signal of the wireless LAN of about 5 GHz are generated. In the receiver for the UWB-IR radio communication, an impulse reception signal and a local signal of about 4 GHz are mixed by the mixer, whereby an analog baseband signal in a frequency band of about 500 MHz is generated. It has been clarified that, when the receiver for the UWB-IR radio communication receives the RF signal of the radio LAN of about 5 GHz, an interfering signal of about 5 GHz and a local signal of about 4 GHz are mixed by the mixer. Therefore, it is necessary to sufficiently reduce an interfering signal level of the spurious interfering signal of about 1 GHz due to the radio LAN with a center frequency of about 5 GHz and secure the analog baseband signal desired in the UWB-IR radio communication at a practical reception level. It has also been clarified that it is necessary to set an attenuation amount in an input frequency of 1 GHz of the low-pass filter connected to the output of the mixer to as large as −60 dB or less and set an attenuation amount in an input frequency of 500 MHz equal to or larger than a cutoff frequency of about 350 MHz to as small as −20 dB or less.

It is difficult to realize the low-pass filter having such a steep attenuation characteristic with a combination of passive elements of a resistor, a capacitor, and an inductor. Prior to the present invention, the inventors also examined the use of a high-order active filter obtained by combining plural unit active filters including an active amplifier and a capacitor. This active amplifier is called an operational transconductance amplifier. A receiver for the UWB-IR radio communication including an integrator based on the operational transconductance amplifier is also described in the Non-Patent Document 1.

The inventors has clarified a problem in that power consumption considerably increases because, whereas a bias current does not flow to the low-pass filter constituted by the combination of the passive elements, a large bias current flows to the active amplifier of the low-pass filter constituted by the active filters in an operation state.

Moreover, in the examination prior to the present invention, the inventors has also clarified that, when the low-pass filter having a steep attenuation characteristic is constituted by the high-order active filter obtained by combining plural unit active filters, a delay time of the low-pass filter responding to the analog baseband signal of about 500 MHz desired in the UWB-IR radio communication is about 2 to 3 nano-seconds, which is equal to or longer than the time width of about 2 nano-seconds of the impulse signal of the UWB-IR radio communication.

FIG. 25 is a circuit diagram showing the low-pass filter connected to the output of the mixer of the receiver for the UWB-IR radio communication examined by the inventors prior to the present invention. As shown in the figure, a low-pass filter LPF is constituted by a quintic filter including a transmission zero generating unit TZG, a secondary low-pass filter 2ndLPF, a primary low-pass filter 1stLPF, a secondary low-pass filter 2ndLPF, and a primary all-pass filter 1stAPF. The low-pass filter LPF includes a large number of operational transconductance amplifiers and a large number of capacitors.

FIG. 26 is a diagram showing a frequency characteristic of an attenuation characteristic of the low-pass filter LPF shown in FIG. 25. As shown in the figure, a cutoff frequency fc at −3 dB down point of the low-pass filter LPF is about 350 MHz. An attenuation amount at an input frequency of 500 MHz is set to as small as −20 dB or more. An attenuation amount at an input frequency of 1 GHz is set to as large as −60 dB or less.

FIG. 27 is a diagram showing a frequency characteristic of a delay characteristic of the low-pass filter LPF shown in FIG. 25. As shown in the figure, at an input frequency equal to or lower than the cutoff frequency fc of about 350 MHz, the low-pass filter LPF has a delay time of about 2 to 3 nanoseconds.

FIG. 28 is a diagram showing waveforms of respective units of the receiver for the UWB-IR radio communication examined by the inventors prior to the present invention. A first waveform from the top in FIG. 28 is a waveform of an impulse received by the antenna of this receiver. A second waveform from the top in FIG. 28 indicates an amplification operation by the low noise amplifier. A third waveform from the top in FIG. 28 indicates a mixing operation by the mixer. A fourth waveform from the top in FIG. 28 indicates a filtering operation by the low-pass filter. A fifth waveform from the top in FIG. 28 indicates an amplification operation by the variable gain amplifier. In this way, it has been clarified that a delay time from the low noise amplifier to the mixer can be substantially neglected but a signal delay time is large, in particular, in the low-pass filter. A delay time Td of about 2 to 3 nano-seconds in the low-pass filter LPF is longer than a time width Tp of about 2 nano-seconds of the impulse signal of the UWB-IR radio communication. Therefore, it has been clarified that, when the intermittent operation technique disclosed in JP-A-2005-217899, which does not assume that a signal is significantly delayed by the low-pass filter, is applied to the low-pass filter and the respective circuit blocks at the post stage of the low-pass filter, an operation period of the low-pass filter and the variable gain amplifier and a period in which an output signal is outputted or an input signal arrives do not synchronize with each other. As a result, an analog baseband signal based on the impulse is lost.

In the receiver for the UWB-IR radio communication system disclosed in JP-A-2005-217899, only the short distance communication is considered. Thus, the receiver does not include a variable gain amplifier that controls an amplification gain according to a communication distance. In order to cause the receiver for the UWB-IR radio communication examined by the inventors prior to the present invention to cope with not only the short distance communication but also the medium distance communication and the long distance communication, the inventors examined the adoption of a variable gain amplifier that controlled an amplification gain according to a communication distance. However, it has been clarified that, since a communication distance is extremely long and, in order to considerably increase the amplification gain of the variable gain amplifier, a bias current of the variable gain amplifier has to be considerably increased and power consumption markedly increases.

The present invention has been devised on the basis of the results of the various examination performed by the inventors prior to the present invention.

Therefore, it is an object of the present invention to compensate for, in a receiver that includes a low noise amplifier at a first stage, a demodulator at a next stage, and a low-pass filter connected to an output of the demodulator and receives an impulse signal discretely transmitted, increasing power consumption when an active filter is used in the low-pass filter for attenuating an interfering signal with a predetermined attenuation amount.

It is another object of the present invention to prevent, in a receiver that includes a low noise amplifier at a first stage, a demodulator at a next stage, and a low-pass filter connected to an output of the demodulator and receives an impulse signal discretely transmitted, a signal loss in the low-pass filter and the circuits at the post stage of the low-pass filter when an interfering signal is attenuated with a predetermined attenuation amount and power consumption is reduced by causing the low noise amplifier, the mixer, the low-pass filter, and the respective circuit blocks at the post stage of the low-pass filter to intermittently operate.

It is still another object of the present invention to compensate for, in the receiver described above, an increase in power consumption when a variable gain amplifier for coping with not only a short distance communication but also a medium distance communication and a long distance communication is adopted.

The above-mentioned objects, other objects, and new characteristics of the present invention will become evident from the description of this specification and the accompanying drawings.

Aspects of the present invention disclosed in this application are briefly explained below.

A receiver according to a first aspect of the present invention includes a low noise amplifier (110) that amplifiers an impulse signal (Impls) discretely transmitted, demodulators (120, 121) connected to an output of the low noise amplifier (110), low-pass filters (130, 131) connected to outputs of the demodulators (120, 121), analog-to-digital converters (150, 151) that convert analog baseband signals extracted from outputs of the low-pass filters (130, 131) into digital baseband signals, and an operation-timing control unit (190) connected to the low noise amplifier (110), the demodulators (120, 121), the low-pass filters (130, 131), and the analog-to-digital converters (150, 151).

The low-pass filters (130, 131) are constituted by active filters (TZG, 2ndLPF, 1stLPF, 2ndLPF, and 1stAPF) including active amplifiers (OTA1 to OTA8) (see FIG. 25). Thus, the low-pass filters (130, 131) have a predetermined frequency characteristic to transmit the analog baseband signals of the outputs of the demodulators (120, 121) and, on the other hand, inhibit an interfering signal having a frequency higher than that of the analog baseband signals (see FIG. 26).

In response to the reception of the impulse signal (Impls) in a reception period of the impulse signal (Impls), the operation-timing control unit (190) controls the low noise amplifier (110), the demodulators (120, 121), the low-pass filters (130, 131), and the analog-to-digital converters (150, 151) to be in an operation state. On the other hand, in a non-reception period of the impulse signal (Impls), the operation-timing control unit (190) controls the low noise amplifier (110), the demodulators (120, 121), the low-pass filters (130, 131), and the analog-to-digital converters (150, 151) to be in a non-operation state. In short, the operation-timing unit (190) executes intermittent operation control (see FIGS. 1 and 2).

According to the first aspect of the present invention, it is possible to compensate for an increase in power consumption of the active amplifiers (OTA1 to OTA8) of the active filters (TZG, 2ndLPF, 1stLPF, 2ndLPF, and 1stAPF) adopted for inhibition of an interfering signal with a reduction in power consumption by the intermittent operation of the low noise amplifier (110), the demodulators (120, 121), the low-pass filters (130, 131), the variable gain amplifiers (140, 141) and the analog-to-digital converters (150, 151).

In the receiver according to the first aspect of the present invention, when the reception period of the impulse signal (Impls) transitions to the non-reception period of the impulse signal (Impls), the operation-timing control unit (190) controls the low-pass filters (130, 131) to be in the operation state during a total time of a delay time (Td) of the low-pass filters (130, 131) corresponding to the predetermined frequency characteristic of the low-pass filters (130, 131) and a time width (Tp) of a pulse width of the impulse signal (Impls) (see FIGS. 1, 2, 3, and 4).

According to the first aspect of the present invention, when the reception period of the impulse signal (Impls) transitions to the non-reception period of the impulse signal (Impls), the low-pass filters (130, 131) are controlled to be in the operation state during the total time of the delay time (Td) of the low-pass filters (130, 131) and the time width (Tp) of the pulse width of the impulse signal (Impls). Thus, it is possible to prevent a signal loss in the low-pass filters (130, 131) that have the relative large delay time (Td).

In the receiver according to the first aspect of the present invention, when the reception period of the impulse signal (Impls) transitions to the non-reception period of the impulse signal (Impls), the operation-timing control unit (190) controls the analog-to-digital converters (150, 151) to be in the operation state at least during a period of the time width (Tp) of the pulse width of the impulse signal (Impls) after the elapse of the delay time (Td) of the low-pass filters (130, 131) (see FIGS. 1, 2, 3, and 4).

According to the first aspect of the present invention, it is possible to prevent a signal loss in the analog-to-digital converters (150, 151).

According to the first aspect of the invention, the impulse signal (Impls) is an impulse signal generated by ultra wideband impulse radio communication, a frequency spectrum of the impulse signal (Impls) is an ultra-high frequency band signal with a center frequency of about 4 GHz and a frequency band of about 500 MHz, the interfering signal having a frequency higher than that of the analog baseband signals is a spurious interfering signal of about 1 GHz generated by a 5 GHz wireless LAN.

According to the first aspect of the present invention, the low-pass filters (130, 131) are constituted by the high-order active filters (TZG, 2ndLPF, 1stLPF, 2ndLPF, and 1stAPF) including the plural active amplifiers (OTA1 to OTA8) and the plural capacitors (C11 to C6) (see FIG. 25).

According to the first aspect of the present invention, the low noise amplifier (110), the demodulators (120, 121), the low-pass filters (130, 131), and the analog-to-digital converters (150, 151) constitute a serial connection circuit. A switch that controls an intermittent operation of electronic circuits at odd number stages of the serial connection circuit is connected to one of a power supply voltage side and a ground voltage side. A switch that controls an intermittent operation of electronic circuits at even number stages of the serial connection circuit is connected to the other of the power supply voltage side and the ground voltage side (see FIG. 1).

The receiver according to the first aspect of the present invention further includes a baseband processing unit (160) that processes the digital baseband signals of the outputs of the analog-to-digital converters (150, 151).

The baseband processing unit (160) performs synchronous acquisition of the impulse signal (Impls) on the basis of the digital baseband signals (RX_Data) of preamble data transferred before transfer of payload data in the ultra wideband impulse radio communication outputted from the analog-to-digital converters (150, 151) (see FIG. 5).

According to the first aspect of the present invention, the demodulator is constituted by the mixers (120, 121) or a square demodulator (122) (see FIGS. 1 and 24).

A receiver according to a second aspect of the present invention includes the low noise amplifier (110) that amplifies an impulse signal (Impls) discretely transmitted, the demodulators (120, 121) connected to an output of the low noise amplifier (110), the low-pass filters (130, 131) connected to the outputs of the demodulators (120, 121), variable gain amplifiers (140, 141) connected to the outputs of the low-pass filters (130, 131), the analog-to-digital converters (150, 151) that convert analog baseband signals of outputs of the variable gain amplifiers (140, 141) into digital baseband signals, and the operation-timing control unit (190) connected to the low noise amplifier (110), the demodulators (120, 121), the low-pass filters (130, 131), the variable gain amplifiers (140, 141) and the analog-to-digital converters (150, 151).

When a reception signal level of the impulse signal (Impls) is low, bias currents of the variable gain amplifiers (140, 141) are increased, whereby amplification gains of the variable gain amplifiers (140, 141) are increased.

In response to the reception of the impulse signal (Impls) in a reception period of the impulse signal (Impls), the operation-timing control unit (190) controls the low noise amplifier (110), the demodulators (120, 121), the low-pass filters (130, 131), the variable gain amplifiers (140, 141), and the analog-to-digital converters (150, 151) to be in an operation state. On the other hand, in a non-reception period of the impulse signal (Impls), the operation-timing control unit (190) controls the low noise amplifier (110), the demodulators (120, 121), the low-pass filters (130, 131), the variable gain amplifiers (140, 141), and the analog-to-digital converters (150, 151) to be in a non-operation state. In short, the operation-timing unit (190) executes intermittent operation control (see FIGS. 1, 2, 3, and 4).

According to the second aspect of the present invention, it is possible to compensate for an increase in power consumption due to the adoption of the variable gain amplifiers (140, 141) for coping with not only the short distance communication but also the medium distance communication and the long distance communication with a reduction in power consumption by the intermittent operation of the low noise amplifier (110), the demodulators (120, 121), the low-pass filters (130, 131), the variable gain amplifiers (140, 141), and the analog-to-digital converters (150, 151).

In the receiver according to the second aspect of the present invention, the low-pass filters (130, 131) are constituted by the active filters (TZG, 2ndLPF, 1stLPF, 2ndLPF, and 1stAPF) including the active amplifiers (OTA1 to OTA8) (see FIG. 25). Thus, the low-pass filters (130, 131) have a predetermined frequency characteristic to transmit the analog baseband signals of the outputs of the demodulators (120, 121) and, on the other hand, inhibit an interfering signal having a frequency higher than that of the analog baseband signals (see FIG. 26).

According to the second aspect of the present invention, it is possible to compensate for an increase in power consumption of the active amplifiers (OTA1 to OTA8) of the active filters (TZG, 2ndLPF, 1stLPF, 2ndLPF, and 1stAPF) adopted for inhibition of an interfering signal with a reduction in power consumption by the intermittent operation of the low noise amplifier (110), the demodulators (120, 121), the low-pass filters (130, 131), the variable gain amplifiers (140, 141), and the analog-to-digital converters (150, 151).

BRIEF DESCRIPTION OF THE DRAWINGS

FIG. 3 is a waveform chart for explaining the intermittent operation of the circuits at the respective stages constituting the receiver for the UWB-IR radio communication shown in FIG. 1;

FIG. 4 is a waveform chart for explaining the intermittent operation of the circuits at the respective stages constituting the receiver for the UWB-IR radio communication shown in FIG. 1;

FIG. 14 is a waveform chart in a period until an output signal is stabilized after current interrupting switches at respective stages of a low noise amplifier at a first stage, a mixer at a second stage, a low-pass filter at a third stage, a variable gain amplifier at a fourth stage, and an analog-to-digital converter at a fifth stage of the receiver for the UWB-IR radio communication shown in FIG. 12 are turned on;

DETAILED DESCRIPTION OF THE PREFERRED EMBODIMENTS

Embodiments of the present invention will be explained with reference to the accompanying drawings. The embodiments explained below are merely examples for carrying out the present invention and do not limit the present invention.

First Embodiment

Receiver for the UWB-IR Radio Communication

Figure 1:
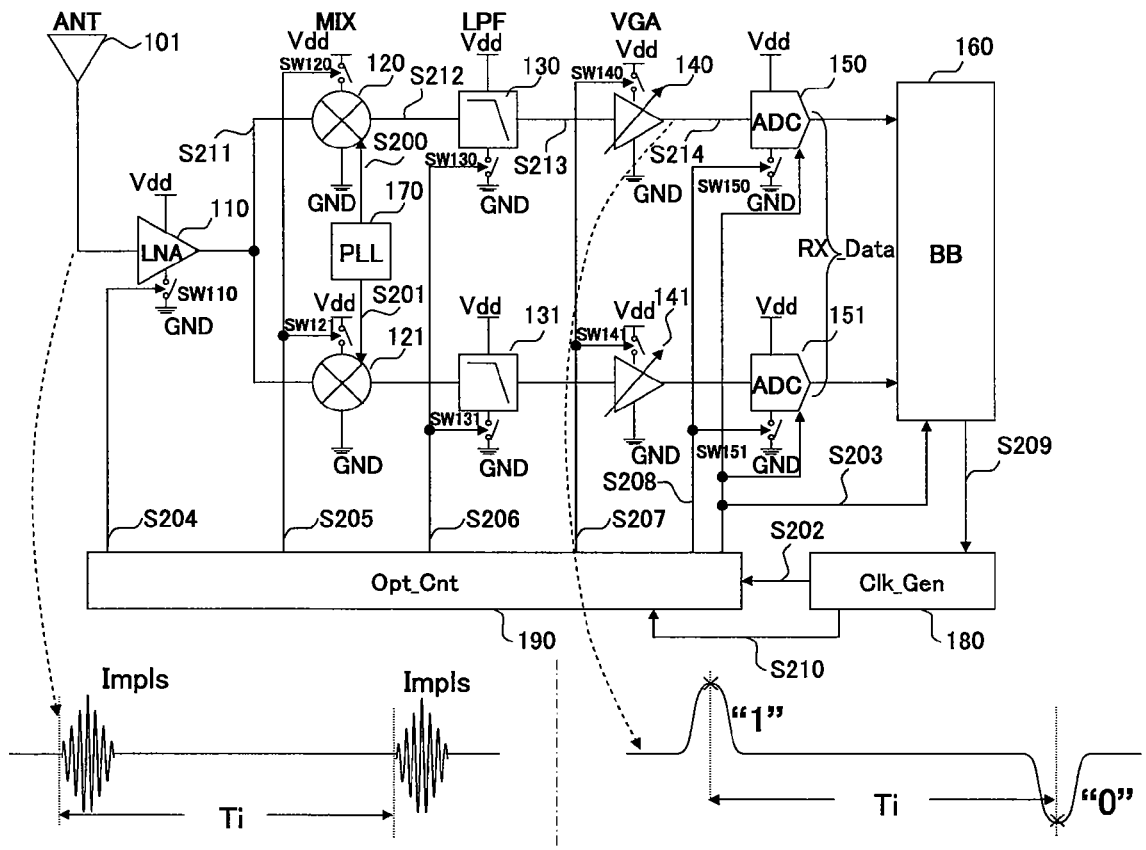
FIG. 1 is a block diagram showing a structure of a receiver for the UWB-IR radio communication according to a first embodiment of the present invention.

FIG. 1 is a block diagram showing a structure of a receiver for the UWB-IR radio communication according to a first embodiment of the present invention.

A time width of an impulse signal (Impls) of the UWB-IR radio communication received by the receiver for the UWB-IR radio communication according to this embodiment is about 2 nano-seconds and an interval Ti between the impulse signal Impls and the impulse signal Impls is about 30 nano-seconds. A frequency spectrum of the impulse signal Impls is an ultra-high frequency band signal with a center frequency of about 4 GHz and a frequency band of about 500 MHz. The receiver for the UWB-IR radio communication according to this embodiment includes a reception antenna (ANT) 101, a low noise amplifier (LNA) 110, mixers (MIX) 120 and 121, low-pass filters (LPF) 130 and 131, variable gain amplifiers (VGA) 140 and 141, analog-to-digital converters (ADC) 150 and 151, a baseband processing unit (BB) 160, a phase locked loop (PLL) 170, a clock generating unit (Clk_Gen) 180, and an operation-timing control unit 190 (Opt_Cnt).

An impulse reception signal Impls of the UWB-IR radio communication received by the reception antenna 101 is amplified by the low noise amplifier 110. Frequency conversion according to mixing of the impulse reception signal and local signals S200 and S201 outputted from the phase locked loop 170 is performed by the mixers 120 and 121. As a result, analog baseband signals in the frequency band of about 500 MHz are formed from outputs of the mixers 120 and 121. The local signals S200 and S201 from the phase locked loop 170 are signals having phases 90 degrees different from each other.

The impulse reception signal Impls of the UWB-IR radio communication received by the reception antenna 101 includes, as shown in FIG. 1, an RF ultra-high frequency component with a center frequency of about 4 GHz and an analog baseband signal component with a frequency bandwidth of about 500 MHz. The analog baseband signal component with the frequency bandwidth of about 500 MHz corresponds to an envelope signal component of the impulse reception signal Impls. When synchronous acquisition of the UWB-IR radio communication explained later is completed, a phase of the local signals S200 and S201 supplied from the phase locked loop 170 to the mixers 120 and 121 coincides with a phase of the RF ultra-high frequency component of about 4 GHz of the impulse reception signal Impls.

In performing frequency down-conversion of the RF ultra-high frequency signal of about 4 GHz of the received impulse reception signal Impls into the analog baseband signal with the frequency bandwidth of about 500 MHz, the mixers 120 and 121 sample the RF ultra-high frequency component of about 4 GHz of the impulse reception signal Impls at timing of the local signals S200 and S201. According to this sampling, the mixers 120 and 121 form the envelope signal component (the analog baseband signal component) of the impulse reception signal Impls. Therefore, the mixers 120 and 121 operate as frequency down-converters and also operate as synchronous detection demodulators that synchronously detect a signal level of the impulse reception signal Impls at the timing of the local signals S200 and S201. Since the mixers 120 and 121 of the receiver for the UWB-IR radio communication shown in FIG. 1, this receiver is called a coherent receiver.

Outputs of the mixers 120 and 121 include the envelope signal component (the analog baseband signal component) of the impulse reception signal Impls and also include an unnecessary RF ultra-high frequency component of about 4 GHz of the impulse reception signal Impls and unnecessary ultra-high frequency components of the local signals S200 and S201. In order to inhibit these unnecessary ultra-high frequency components, output signals of the mixers 120 and 121 are supplied to the low-pass filters (LPF) 130 and 131. If a phase of the local signals S200 and S201 does not coincide with a phase of the RF ultra-high frequency component of about 4 GHz of the impulse reception signal Impls, it is impossible to form the envelope signal component (the analog baseband signal component) of the impulse reception signal Impls from the output of the mixers 120 and 121 serving as the synchronous detection demodulator. Almost only the RF ultra-high frequency component of about 4 GHz is generated. In this way, a desired frequency signal is extracted from the analog baseband signal subjected to frequency conversion by the low-pass filters (LPF) 130 and 131. The analog baseband signal is amplified to a predetermined level by the variable gain amplifiers 140 and 141.

Figure 25:
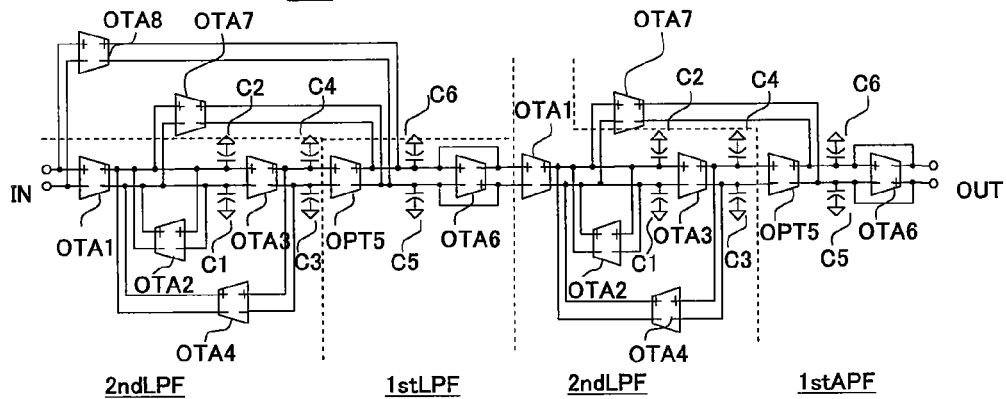
FIG. 25 is a circuit diagram showing a low-pass filter used in a receiver for the UWB-IR radio communication examined by the inventors prior to the present invention and the receivers for the UWB-IR radio communication according to the embodiments of the present invention.

Like the low-pass filter connected to the output of the mixer of the receiver for the UWB-IR radio communication examined prior to the present invention, the low-pass filters (LPF) 130 and 131 of the receiver for the UWB-IR radio communication in FIG. 1 are constituted by a quintic filter shown in FIG. 25 in order to sufficiently reduce an interfering signal level of a spurious interfering signal of about 1 GHz generated by the 5 GHz radio LAN and secure a desired analog baseband signal for the UWB-IR radio communication at a practical reception level. This quintic filter is constituted by a quintic filer including a transmission zero generating unit TZG, a secondary low-pass filter 2ndLPF, a primary low-pass filter 1stLPF, a secondary low-pass filter 2ndLPF, and a primary all pass filter 1stAPF. The quintic filter includes a large number of operational transconductance amplifiers OTA1 to OTA8 and a large number of capacitors C1 to C6.

Figure 26:
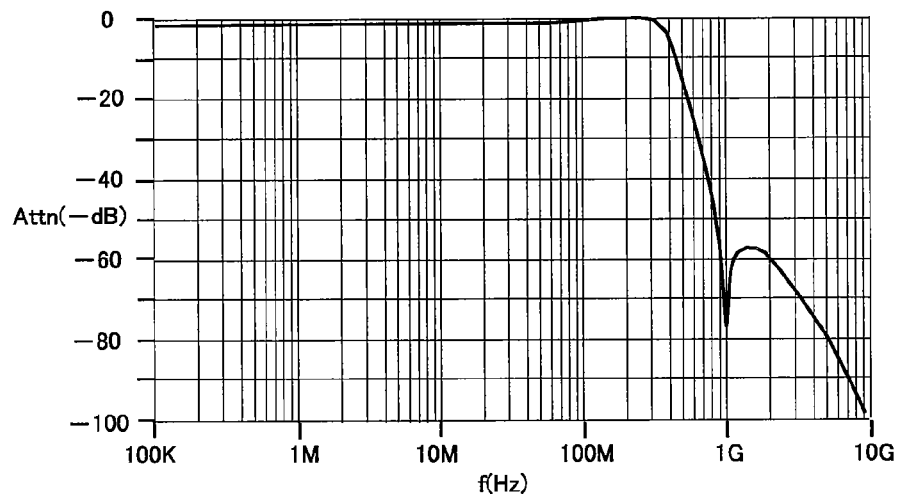
FIG. 26 is a graph showing a frequency characteristic of an attenuation characteristic of a low-pass filter LPF shown in FIG. 25.

Therefore, as shown in FIG. 26, a cutoff frequency fc at −3 dB down point of the low-pass filter LPF is about 350 MHz. An attenuation amount at an input frequency of 500 MHz is set to as small as −20 dB or more. An attenuation amount at an input frequency of 1 GHz is set to as large as −60 dB or less.

Figure 27:
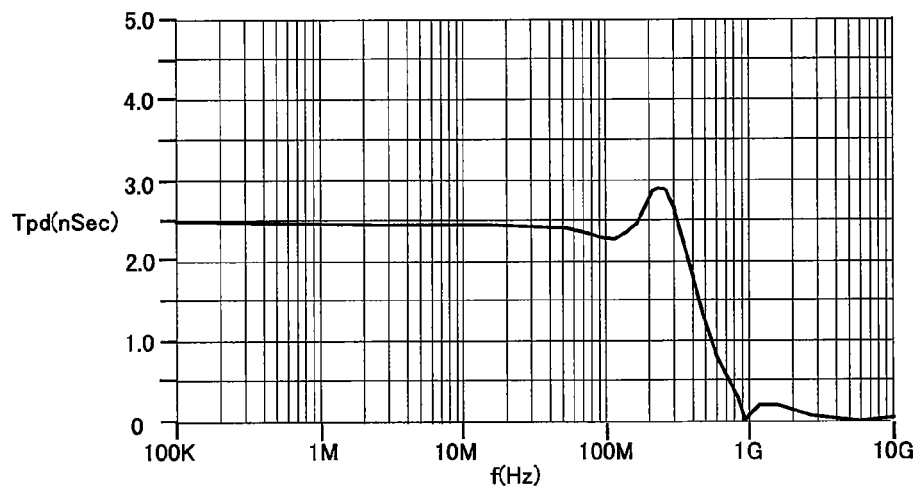
FIG. 27 is a graph showing a frequency characteristic of a delay characteristic of the low-pass filter LPF shown in FIG. 25.
Figure 28:
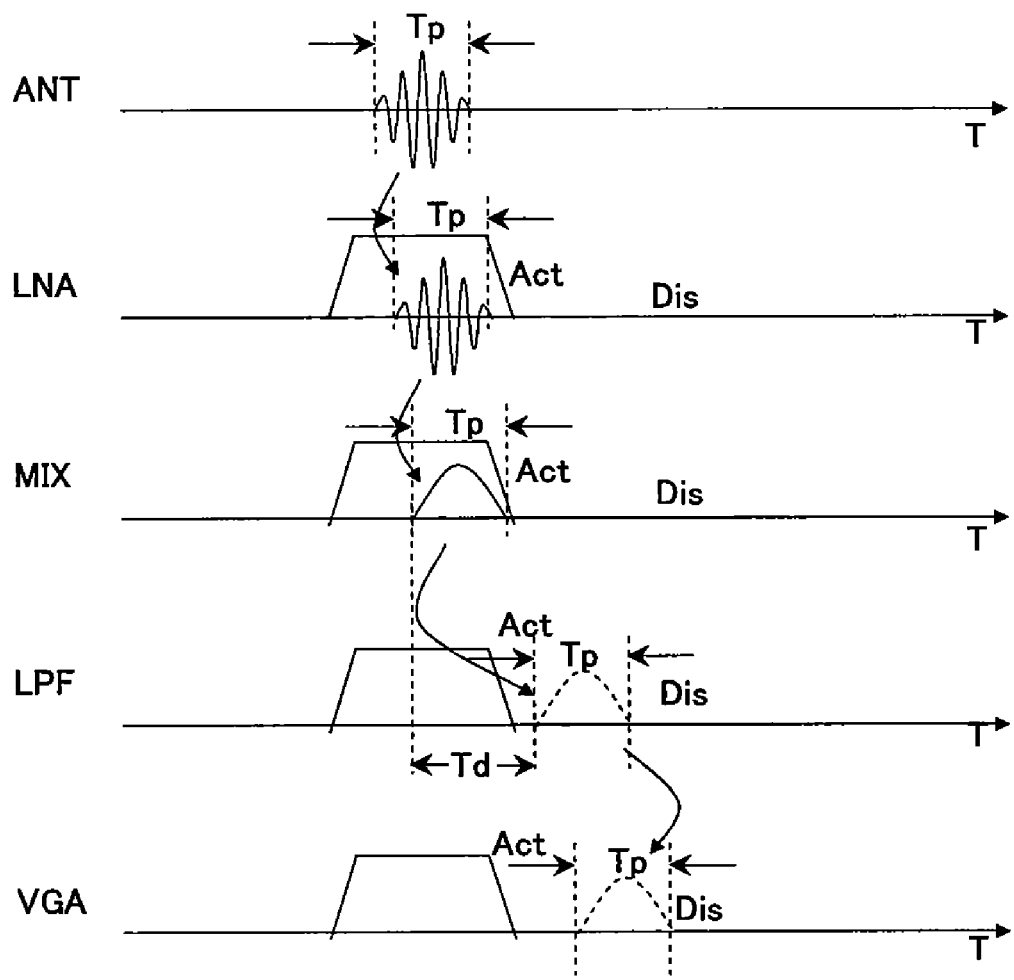
FIG. 28 is a diagram showing waveforms of respective units of the receiver for the UWB-IR radio communication examined by the inventors prior to the present invention.

As shown in FIG. 27, at an input frequency equal to or lower than the cutoff frequency fc of about 350 MHz, the low-pass filter LPF shown in FIG. 25 has a delay time of about 2 to 3 nanoseconds. The baseband processing unit 160 may control gains of the variable gain amplifiers 140 and 141 on the basis of output signals of the analog-to-digital converters 150 and 151. Alternatively, a control circuit may be added to detect output signal intensities of the variable gain amplifiers 140 and 141 and control the gains on the basis of a result of the detection. Thereafter, the amplified analog baseband signal is converted into digital baseband signals RX_Data by the analog-to-digital converters (ADC) 150 and 151 and supplied to the baseband processing unit 160.

The baseband processing unit 160 performs synchronous acquisition, synchronous tracking, data restoration, and the like of the impulse reception signal on the basis of the digital baseband signals RX_Data outputted from the analog-to-digital converters 150 and 151. The baseband processing unit 160 outputs a timing control signal S209 on the basis of results of the synchronous acquisition and the synchronous tracking and controls timing of a clock signal S202 outputted from the clock generating unit 180. For example, when it is seen as a result of the synchronous tracking that arrival timing of the impulse reception signal is earlier than timing for sampling the impulse reception signal, the baseband processing unit 160 brings forward the timing of the clock signal S202 and brings the timing for sampling the impulse reception signal close to the arrival timing of the impulse reception signal.

The clock signal S202 from the clock generating unit 180 is supplied to the operation-timing control unit 190. The operation-timing control unit 190 outputs a clock signal S203 to the analog-to-digital converters 150 and 151 and the baseband processing unit 160. Moreover, the operation-timing control unit 190 supplies intermittent operation control signals S204, S205, S206, S207, and S208 to a power supply switch SW110 connected to the low noise amplifier 110, power supply switches SW120 and SW121 connected to the mixers 120 and 121, power supply switches SW130 and SW131 connected to the low-pass filters 130 and 131, power supply switches SW140 and SW141 connected to the variable gain amplifiers 140 and 141, and power supplies switches SW150 and SW151 connected to the analog-to-digital converters 150 and 151, respectively. The intermittent operation control signals S204, S205, S206, S207, and S208 controls intermittent operations of the circuits at the respective stages by performing on/off control operations for the power supply switches SW110, SW120, SW121, SW130, SW131, SW140, SW141, SW150, and SW151 that interrupt the current paths of the circuits at the respective steps. For example, when these power supply switches are switches that are turned on when a high-level power supply voltage is inputted and turned off when a low-level ground voltage is inputted, the intermittent operation control signals S204, S205, S206, S207, and S208 have a waveform that is at the high-level power supply voltage only in an operation period of the circuits at the respective stages and at the low-level ground voltage in the remaining periods.

Figure 2:
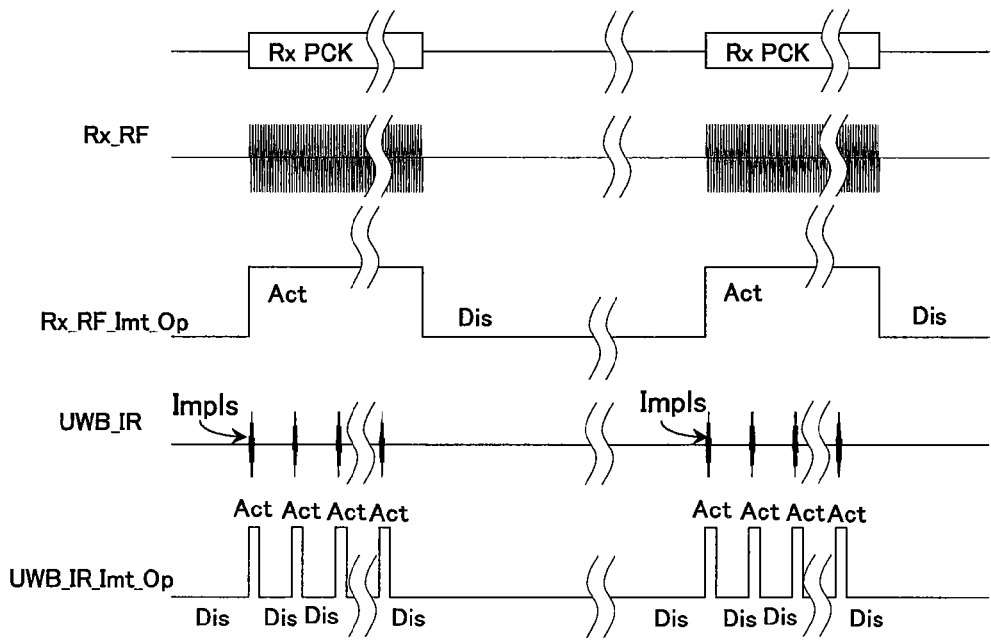
FIG. 2 is a waveform chart for explaining an example of an intermittent operation of circuits at respective stages constituting the receiver for the UWB-IR radio communication shown in FIG. 1.

FIG. 2 is a waveform chart for explaining an example of the intermittent operations of the circuits at the respective stages constituting the receiver for the UWB-IR radio communication shown in FIG. 1. In the past, for example, in a cellular phone of the GSM system (Global System for Mobile Communication), a communication operation of a cellular phone terminal is divided into a reception slot for performing reception from a base station, a transmission slot for performing transmission to the base station, and an idle slot not performing reception or transmission in accordance with the TDMA (Time-Division Multiple Access) system. Therefore, as indicated by upper three waveforms in FIG. 2, in the reception slot in the communication system by the TDMA system of the GSM system, an RF reception intermittent operation RX_RF_Imp_OP of the cellular phone terminal is set in an active state Act for reception of an RF reception signal Rx_RF and reception of a reception packet data RxPCK. However, in the transmission slot and the idle slot, the reception of the RF reception signal Rx_RF is stopped, the reception of the reception packet data RxPCK of the baseband signal is also stopped, and the RF reception intermittent operation RX_RF_Imp_OP is brought into a disable state Dis.

On the other hand, in the receiver for the UWB-IR radio communication shown in FIG. 1, as indicated by lower two waveforms in FIG. 2, a UWB_IR reception intermittent operation UWB_IR_Imp_OP is controlled to be in the active state Act and the disable state Dis in a period in which the impulse reception signal UWB_IR of the UWB-IR communication is present and a period in which the impulse reception signal UWB_IR is not present during packet reception, respectively.

Therefore, in the receiver for the UWB-IR radio communication, timing of the clock signal S203 supplied to the baseband processing unit 160 and timing of the intermittent operation control signal S204, S205, S206, S207, and S208 supplied to the power supply switches of the circuits at the respective stages are set taking into account transmission delay times at the time when signals are transmitted through the circuits at the respective stages and startup times until the circuits at the respective stages start operations after the switches that control the current paths of the circuits at the respective stages are turned on. Therefore, a circuit having a long transmission delay time compared with the other circuits needs a startup time longer than those of the other circuits.

FIG. 3 is a waveform chart for explaining intermittent operations of the circuits at the respective stages constituting the receiver for the UWB-IR radio communication shown in FIG. 1. In particular, it is taken into account that the delay time Td of about 2 to 3 nano-seconds in the low-pass filters (LPF) 130 and 131 is longer than the time width Tp of about 2 nano-seconds of the impulse signal of the UWB-IR radio communication. Therefore, a period in which the intermittent operation control signal S206 for controlling the low-pass filters 130 and 131 to be in the active state Act is set longer than a total time of the delay time Td of about 2 to 3 nano-seconds of the low-pass filters 130 and 131 and the time width Tp of about 2 nano-seconds of the impulse signal of the UWB-IR radio communication. As shown in FIG. 3, the circuits at the respective stages are controlled to be in the active state Act in the high level period of the intermittent operation control signals S204, S205, S206, S207, and S208 supplied to the power supply switches of the circuits of the respective stages. The circuits at the respective stages are controlled to be in the disable state Dis in the low level period of the intermittent operation control signal S204, S205, S206, S207, and S208. In other words, in the low noise amplifier 110, the mixers 120 and 121, the low-pass filters 130 and 131, the variable gain amplifiers 140 and 141, and the analog-to-digital converters 150 and 151, operation periods and timings of all the circuits are set equal on the basis of the transmission delay times and the startup times of the respective circuits such that input signals thereto can be processed normally. As a result, as indicated by an output signal S211 of the low noise amplifier 110, an output signal S212 of the mixer 120, an output signal S213 of the low-pass filter 130, and an output signal S214 of the variable gain amplifier 140, a signal is transmitted without loss in the circuits at the respective stages, and sampled at timing SPL of the clock signal S203 and converted into a digital baseband signal by the analog-to-digital converter 150.

FIG. 4 is a waveform chart for explaining other intermittent operations of the circuits at the respective stages constituting the receiver for the UWB-IR radio communication shown in FIG. 1. As shown in FIG. 4, the circuits at the respective stages are controlled to be in the active state Act in the high level period of the intermittent operation control signals S204, S205, S206, S207, and S208 supplied to the power supply switches of the circuits at the respective stages and controlled to be in the disable state Dis in the low level period of the intermittent operation control signals S204, S205, S206, S207, and S208. The waveform chart in FIG. 4 is different from the waveform chart in FIG. 3 in that operation periods and timings of the respective circuits are individually set on the basis of the transmission delay times and the startup times of the respective circuits such that the low noise amplifier 110, the mixers 120 and 121, the low-pass filters 130 and 131, the variable gain amplifiers 140 and 141, and the analog-to-digital converters 150 and 151 can normally process input signals thereto. In other words, an operation period in which the low-pass filter 130 is controlled to be in the active state Act is set longer than an operation period in which the other circuits are controlled to be in the active state Act. Therefore, compared with the waveform chart in FIG. 3, in the waveform chart in FIG. 4, since it is possible to reduce unnecessary operation period in the circuits at the respective stages, it is possible to further reduce power consumption.

It is also possible to adopt a waveform chart in the middle of the waveform chart in FIG. 3 and the waveform chart in FIG. 4. In other words, it is also possible to set operation periods and timings of a part of the circuits equal and set operation periods and timings of the remaining circuits individually. For example, operation periods and timings of the low noise amplifier 110 and the mixers 120 and 121 may be set equal and operation periods and timings of the low-pass filters 130 and 131 and the variable gain amplifiers 140 and 141 may be set individually.

The structure of the receiver for the UWB-IR radio communication in FIG. 1 is only an example. For example, it is possible to insert a band pass filter or a high-pass filter into a pre-stage or a post stage of the low noise amplifier 110, use low-pass filters and variable gain amplifiers, and add an amplifier. In that case, intermittent operation control signals are supplied to these added circuits in the same manner to perform intermittent operation control.

The structure of the receiver for the UWB-IR radio communication in FIG. 1 is an example in which radio communication is assumed. However, the present invention is not limited to the radio communication. It is also possible to apply the present invention to a receiver for UWB-IR wire communication. A difference between the radio communication and the wire communication is only a difference in a propagation path. In the case of the receiver for the UWB-IR wire communication, a communication signal line only has to be directly connected to the low noise amplifier 110 without using the reception antenna 101. For example, the receiver communicates via wiring on a printed board, a power supply line, and other materials. An equalizer may be arranged at the pre-stage or the post stage of the low noise amplifier 110. In that case, it is possible to cause the circuits at the respective stages constituting the receiver for the UWB-IR wire communication including the equalizer to execute intermittent operations. When there is a circuit in which a transmission delay time and a startup time are extremely long and a sufficient operation stop period in the disable state Dis cannot be secured, intermittent operations only have to be performed for the other circuits. When a section in which an operation can be stopped and a section in which an operation cannot be stopped are mixed in one circuit block, intermittent operations only have to be performed for the circuits in the section in which an operation can be stopped. For example, a comparator that compares analog input signals and reference voltages of the analog-to-digital converters (ADC) 150 and 151 is caused to stop an operation. A band gap voltage generation circuit that generates a reference voltage is not caused to perform an intermittent operation and stop an operation because a startup time thereof is long.

Figure 5:
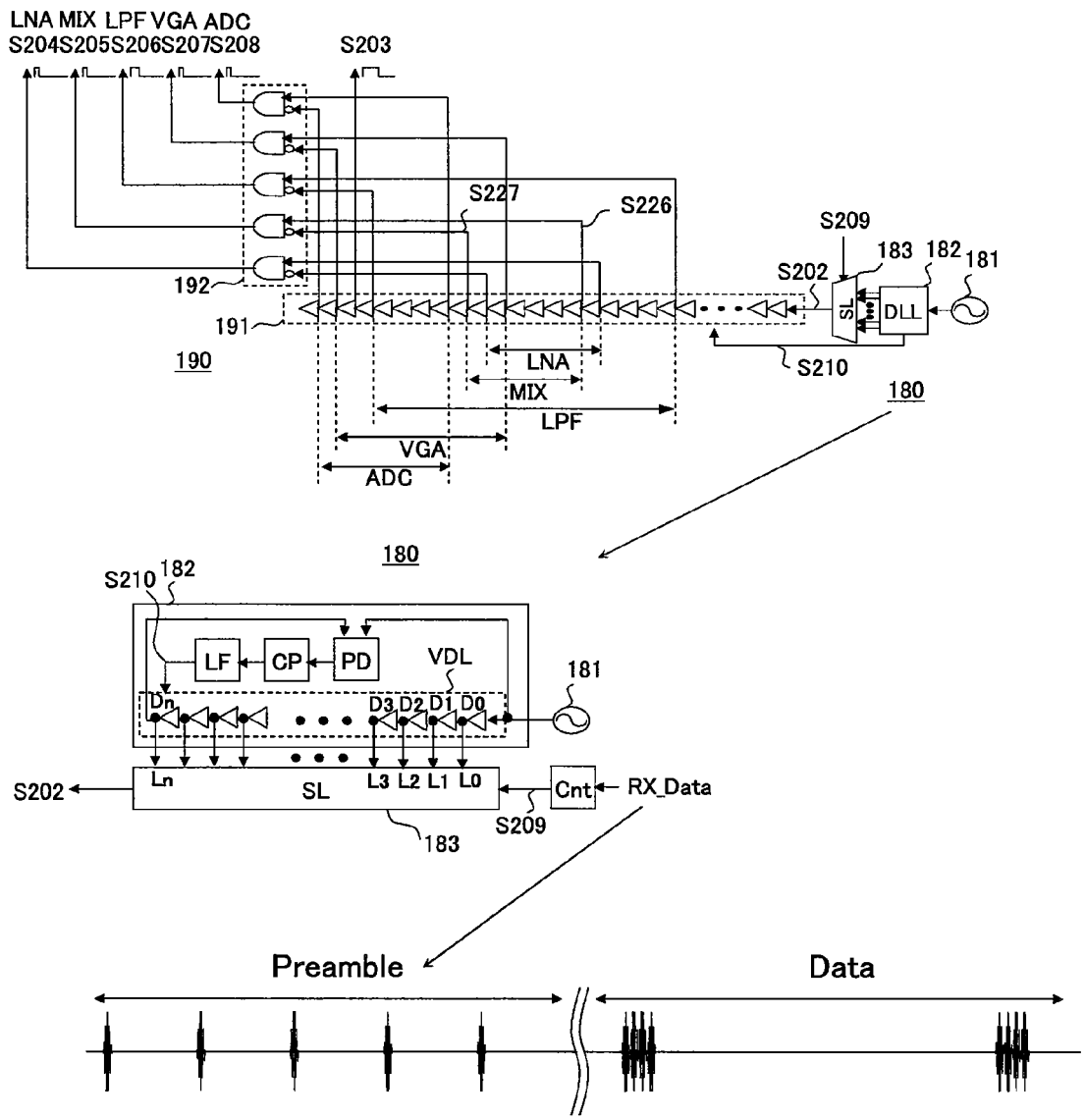
FIG. 5 is a block diagram showing a structure of an operation-timing control unit and a clock generating unit of the receiver for the UWB-IR radio communication in FIG. 1.

FIG. 5 is a block diagram showing structure of the operation-timing control unit 190 and the clock generating unit 180 of the receiver for the UWB-IR radio communication in FIG. 1. As shown in the figure, the operation-timing control unit 190 includes a delay circuit row 191 and a logic circuit 192. The clock generating unit 180 includes an oscillator 181, a delay lock loop 182, and a selector 183. A clock signal from an output of the oscillator 181 is supplied to the delay lock loop 182. In the delay lock loop 182, as shown in a detailed diagram in the center of FIG. 5, a phase comparator PD, a charge pump CP, and a loop filter LF of the delay lock loop 182 perform negative feedback control operations such that a phase of the clock signal from the output of the oscillator 181 and a phase of a delay clock signal of a variable delay circuit VDL of the delay lock loop 182 coincide with each other. This negative feedback control is performed according to a delay time control signal S210 of an output of the loop filter LF.

As shown in a waveform chart at the bottom of FIG. 5, synchronous acquisition of the receiver for the UWB-IR radio communication is executed using reception data Rx_Data of preamble data Preamble transferred before the transfer of payload data Data in the UWB-IR radio communication. The reception data Rx_Data of the preamble data Preamble from the analog-to-digital converters 150 and 151 is supplied to an input of a control circuit Cnt via the baseband processing unit 160. The control signal S209 of an output of the control circuit Cnt causes the selector 183 to select an output signal L0 of a delay circuit D0 at a first stage of the variable delay circuit VDL as an initial value and output the output signal L0 as the output signal S202. Timing of the intermittent operation control signals S204, S205, S206, S207, and S208 generated by the operation-timing control unit 190 is determined by the clock generating unit 180 according to timing of the clock output signal S202 selected. The circuits at the respective stages constituting the receiver for the UWB-IR radio communication respond to the intermittent operation control signals S204, S205, S206, S207, and S208 at this timing. Digital baseband signals are supplied from the outputs of the analog-to-digital converters (ADC) 150 and 151 of the UWB-IR receiver to the baseband processing unit (BB) 160. The control circuit Cnt checks whether accurate binary data of "1" and "0" is obtained from the reception data Rx_Data of the preamble data Preamble supplied on the basis of the digital baseband signal. When the accurate binary data is not obtained, the control signal S209 of the output of the control circuit Cnt causes the selector 183 to select an output signal L1 of a delay circuit D1 at a second stage of the variable delay circuit VDL and output the output signal L1 as the output signal S202. The control circuit Cnt checks again whether accurate binary data is obtained. According to repletion of the same processing, timing of the clock output signal S202 selected and outputted by the clock generating unit 180 and timing of the reception data Rx_Data of the preamble data Preamble coincide with each other. The synchronous acquisition of the receiver for the UWB-IR radio communication is completed.

When the synchronous acquisition is completed, in order to receive the payload data Data in the UWB-IR radio communication, the operation-timing control unit 190 determines final timing of the intermittent operation control signals S204, S205, S206, S207, and S208 on the basis of the clock output signal S202 of the clock generating unit 180 for which the synchronous acquisition is completed.

Respective delay circuits connected in series of the delay circuit row 191 of the operation-timing control unit 190 output delay signals in response to the clock output signal S202 from the clock generating unit 180. A delay pulse outputted from the delay circuit row 191 first is supplied to a non-inverting input terminal of a third AND circuit of the logic circuit 192. The intermittent operation control signal S206 for controlling the low-pass filters 130 and 131 to be in the active state is generated from the third AND circuit. A delay pulse outputted from the delay circuit row 191 second is supplied to a non-inverting input terminal of a fifth AND circuit of the logic circuit 192. The intermittent operation control signal S204 for controlling the low noise amplifier 110 to be in the active state Act is generated. A delay pulse outputted from the delay circuit row 191 third is supplied to a non-inverting input terminal of a fourth AND circuit of the logic circuit 192. An intermittent operation control signal S205 for controlling the mixers 120 and 121 to be in the active state Act is generated. A delay pulse outputted from the delay circuit row 191 fourth is supplied to a non-inverting terminal of a second AND circuit of the logic circuit 192. The intermittent operation control signal S207 for controlling the variable gain amplifiers 140 and 141 to be in the active state Act is generated. A delay pulse outputted from the delay circuit row 191 fifth is supplied to an inverting input terminal of the fifth AND circuit of the logic circuit 192. The intermittent operation control signal S204 for controlling the low noise amplifier 110 to be in the disable state Dis is generated. A delay pulse outputted from the delay circuit row 191 sixth is supplied to an inverting input terminal of the fourth AND circuit. The intermittent operation control signal S205 for controlling the mixers 120 and 121 to be in the disable state Dis is generated. A delay pulse outputted from the delay circuit row 191 seventh is supplied to a non-inverting input terminal of a first AND circuit of the logic circuit 192. The intermittent operation control signal S208 for controlling the analog-to-digital converters 150 and 151 to be in the active state Act is generated. A delay pulse outputted from the delay circuit row 191 eighth is supplied to an inverting input terminal of the third AND circuit of the logic circuit 192. The intermittent operation control signal S206 for controlling the low-pass filters 130 and 131 to be in the disable state Dis is generated from an output of the third AND circuit. A delay pulse outputted from the delay circuit row 191 ninth is supplied to an inverting input terminal of the second AND circuit of the logic circuit 192. The intermittent operation control signal S207 for controlling the variable gain amplifiers 140 and 141 to be in the disable state Dis is generated. A delay pulse outputted from the delay circuit row 191 tenth is supplied to an inverting input terminal of the first AND circuit. The intermittent operation control signal S208 for controlling the analog-to-digital converters 150 and 151 to be in the disable state Dis is generated. In this way, it is possible to generate waveforms of the intermittent operation control signals S204, S205, S206, S207, and S208 shown in the waveform chart in FIG. 4 by using the operation-timing control unit 190 and the clock generating unit 180 shown in FIG. 5.

It is recommended that the respective delay circuits of the delay circuit row 191 of the operation-timing control unit 190 be identical with respective delay circuits D0 to Dn constituting the variable delay circuit VDL of the delay lock loop 182 in the clock generating unit 180. As shown in FIG. 5, it is recommended that the delay time control signal S210 of the loop filter LF of the delay lock loop 182 be also supplied to the respective delay circuits of the delay circuit row 191 to control delay times. Timing of the respective intermittent operation control signals are not only set according to the number of serially connected delay circuits of the delay circuit row 191 but may be set by individually setting delay times of the respective delay circuits. When there are circuits in which transmission delay times are short and startup times are almost the same, it is possible to use a common intermittent operation control signal. For example, when a transmission delay time of the low noise amplifier 110 is short and a difference between startup times of the low noise amplifier 110 and the mixers 120 and 121 is small, it is possible to supply the intermittent operation control signal S204 not only to the low noise amplifier 110 but also to the mixers 120 and 121. In this case, since the intermittent operation control signal S205 is not used, a logic circuit that generates the intermittent operation control signal S205 is unnecessary. Moreover, when an operation period of the variable gain amplifier 140 is substantially equal to an operation period of the low noise amplifier 110 and only timings thereof are different, it is possible to delay the intermittent operation control signal S204 and supply the intermittent operation control signal S204 to the variable gain amplifier 140. In this case, since the intermittent operation control signal S207 is not used, a logic circuit that generates the intermittent operation control signal S207 is unnecessary. As described above, it is possible to perform intermittent operations according to sampling timing of the analog-to-digital converters 150 and 151 by using the clock output signal S202 controlled on the basis of results of the synchronous acquisition and the synchronous tracking. Thus, it is possible to perform the intermittent operations not only after the synchronous acquisition but also during standby.

Figure 6:
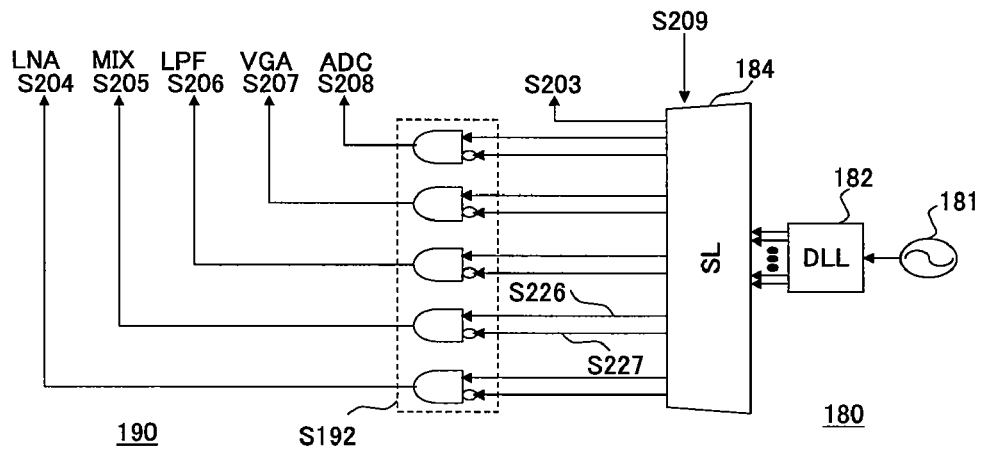
FIG. 6 is a block diagram showing another structure of the operation-timing control unit and the clock generating unit of the receiver for the UWB-IR radio communication in FIG. 1.

FIG. 6 is a block diagram showing another structure of the operation-timing control unit 190 and the clock generating unit 180 of the receiver for the UWB-IR radio communication in FIG. 1. As shown in the figure, the operation-timing control unit 190 and the clock generating unit 180 include the oscillator 181, the delay lock loop 182, the selector 184, and the logic circuit 192. A clock output signal of the oscillator 181 is supplied to the delay lock loop 182. Plural delay signals having phases different from one another from plural delay circuits of the delay lock loop 182 are supplied to the selector 184. The delay signals in the respective delay circuits of the delay lock loop 182 have time resolution necessary for synchronous acquisition and synchronous tracking. The control signal S209 of the output of the control circuit Cnt same as that in FIG. 5 is supplied to the selector 184. The selector 184 selects timing of the plural delay signals supplied from the plural delay circuits of the delay lock loop 182 to the selector 184 and supplies the timing to the logic circuit 192. The logic circuit 192 combines these timing signals and outputs the intermittent operation control signals S204, S205, S206, D207, and S208 for controlling operation periods of the low noise amplifier 110, the mixers 120 and 121, the low-pass filters 130 and 131, the variable gain amplifiers 140 and 141, and the analog-to-digital converters 150 and 151.

In the structure of the operation-timing control unit 190 and the clock generating unit 180 shown in FIG. 6, since the function of the delay circuit row 191 shown in FIG. 5 is given to the delay lock loop 182 in FIG. 5, the delay circuit row 191 in FIG. 5 is unnecessary. Therefore, the structure shown in FIG. 6 is particularly suitable when the number of serially connected delay circuits of the delay circuit row 191 is large in the structure in FIG. 5. Moreover, when intermittent operation control signals of the circuits at the respective stages have equal operation periods and timings as in the intermittent operations in the waveform chart in FIG. 3, the structure shown in FIG. 6 is also suitable when output signals of the selector 184 are reduced to three to reduce a circuit size of the selector 184. It goes without saying that it is possible to further delay the output signals reduced in number of the selector 184 and generate intermittent operation signals of plural timings.

Figure 7:
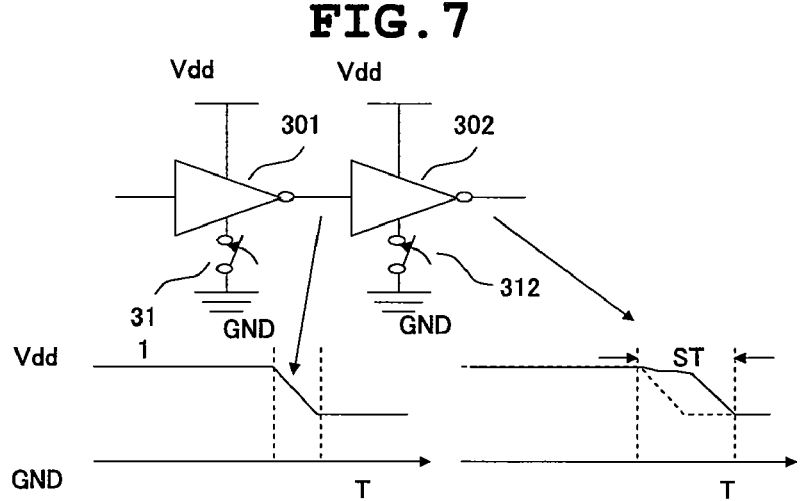
FIG. 7 is a diagram for explaining a control operation by plural switches for causing plural signal inverting circuits connected in series to intermittently operate.

FIG. 7 is a diagram for explaining control operations by plural switches for causing plural signal inverting circuits connected in series to perform intermittent operations. On the other hand, in the receiver for the UWB-IR radio communication in FIG. 1, the low noise amplifier 110 at the first stage, the mixers 120 and 121 at the second stage, the low-pass filters 130 and 131 at the third stage, the variable gain amplifiers 140 and 141, and the analog-to-digital converters 150 and 151 at the fifth stage are connected in series.

In the serially connected circuits of the receiver for the UWB-IR radio communication in FIG. 1, the switches that control intermittent operations of the electronic circuits at the first, third, and fifth stages are connected to the side of the ground voltage GND and the switches that control intermittent operations of the electronic circuits at the second and fourth stages are connected to the side of the power supply voltage Vdd. In general, since various electronic circuits include amplification transistors such as MOS transistors, an output voltage having a phase opposite to a phase of an input voltage supplied to a signal input terminal of an electronic circuit is often generated from an output terminal thereof.

In the circuit in FIG. 7, both switches 311 and 312 for causing serially connected signal inverting circuits 301 and 302 to intermittently operate are connected to the side of the ground voltage GND. Therefore, when the switches 311 and 312 are controlled to be off to bring the signal inverting circuits 301 and 302 into the disable state and interrupt electric currents of the signal inverting circuits 301 and 302, both levels of the output terminals of the signal inverting circuits 301 and 302 are a power supply voltage Vdd. When the switches 311 and 312 are controlled to be on to bring the signal inverting circuits 301 and 302 into the active state, operation currents start to flow to the signal inverting circuits 301 and 302. Thus, the levels of the output terminals of the signal inverting circuits 301 and 302 are about to fall from the power supply voltage Vdd to the predetermined ground voltage GND. Actually, an output voltage level of the signal inverting circuit 301 at a first stage falls from the power supply voltage Vdd to the predetermined ground voltage GND in response to a level of an input voltage. This fall in the output voltage level of the signal inverting circuit 301 at the first stage from the power supply voltage Vdd to the predetermined ground voltage GND results in a change in an input voltage level of the signal inverting circuit 302 at a second stage. Thus, the signal inverting circuit 302 at the second stage attempts to generate an output voltage with an increased level opposite to the change in the input voltage level. However, since the operation current has started to flow to the signal inverting circuit 302, the voltage level of the output terminal of the signal inverting circuit 302 is about to fall from the power supply voltage Vdd to the predetermined ground voltage GND. Therefore, in the signal inverting circuit 302 at the second stage, since operations contradicting each other are applied to the control of the output voltage level of the output terminal, a stabilization time ST required for the output voltage level to stabilize from the power supply voltage Vdd to a final level is long.

Figure 8:
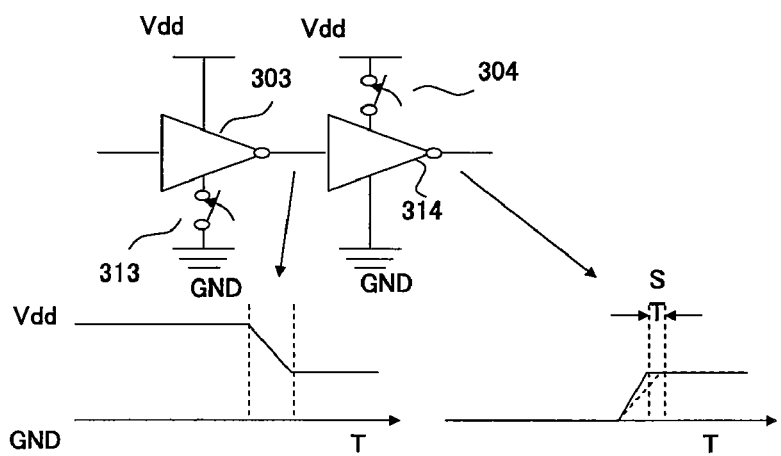
FIG. 8 is a diagram for explaining a control operation by plural switches for causing plural signal inverting circuits connected in series in the receiver for the UWB-IR radio communication in FIG. 1 to intermittently operate.

FIG. 8 is a diagram for explaining control operations by the plural switches for causing the plural signal inverting circuit serially connected in the receiver for the UWB-IR radio communication in FIG. 1 to intermittently operate.

As described above, in the serially connected circuits of the receiver for the UWB-IR radio communication in FIG. 1, the switches that control the intermittent operations of the electronic circuits at the first, third, and fifth stages are connected to the side of the ground voltage GND. The switches that control the intermittent operations of the electronic circuits at the second and fourth electronic circuits are connected to the side of the power supply voltage Vdd.

In the circuit in FIG. 8, a switch SW313 for causing a signal inverting circuit 303 at a first stage of serially connected signal inverting circuits 303 and 304 to intermittently operate is connected to the side of the ground voltage GND. A switch SW314 for causing the signal inverting circuit 304 at a second stage to intermittently operate is connected to the side of the power supply voltage Vdd. Therefore, when the switches 313 and 314 are controlled to be off to bring the signal inverting circuits 303 and 304 into the disable state and interrupt electric currents of the signal inverting circuits 303 and 304, an output voltage level of an output terminal of the signal inverting circuit 303 at the first stage is the power supply voltage Vdd and an output voltage level of an output terminal of the signal inverting circuit 304 at the second stage is the ground voltage GND. When the switches 313 and 314 are controlled to be on in order to bring the signal inverting circuits 303 and 304 into the active stage, an operation current starts to flow to the signal inverting circuits 303 and 304. Thus, the output voltage level of the output terminal of the signal inverting circuit 303 at the first stage falls from the power supply voltage Vdd to the predetermined ground voltage GND and the output voltage level of the output terminal of the signal inverting circuit 304 at the second stage rises from the ground voltage GND to the predetermined power supply voltage Vdd. This fall in the output voltage level of the signal inverting circuit 303 at the first stage from the power supply voltage Vdd to the predetermined ground voltage GND results in a change in an input voltage level of the signal inverting circuit 304 at the second stage. Thus, the rise in the output voltage level of the signal inverting circuit 304 at the second stage from the ground voltage GND to the predetermined power supply voltage Vdd is further accelerated. Therefore, in the signal inverting circuit 304 at the second stage, since an acceleration operation is performed for the control of the output voltage level of the output terminal, it is possible to reduce the stabilization time ST required for the output voltage level to stabilize from the ground voltage GND to the final level.

Therefore, in the serially connected circuit of the receiver for the UWB-IR radio communication in FIG. 1, the switches that control the intermittent operations of the electronic circuits at the first, third, and fifth stages are connected to the side of the ground voltage GND and the switches that control the electronic circuits at the second and fourth stages are connected to the side of the power supply voltage Vdd. Thus, it is possible to reduce the stabilization time ST at the respective stages.

When transmission delay times of the circuits at the respective stages are extremely large, the effect of the reduction in the stabilization time is not shown enough. This is because a change in an output voltage level due to turn-on of the switches and an output voltage change responding to an input voltage change do not occur substantially simultaneously. As an arrangement of the switches, appropriate places are different depending on the circuit structures at the respective stages. As conditions for the appropriate places, a capacity value of a capacitor charged and discharged according to on and off control operations of the switches is small and an electric current for charging and discharging the capacitor is sufficiently large. When a capacity value of the capacitor charged and discharged at the time of the on and off control operations of the switches is large and an electric current for charging and discharging the capacitor is small, time for charging and discharging the capacitor is long. Thus, the stabilization time for the fall or the rise of the output voltage is long. Therefore, even if the switches are alternately arranged on the power supply voltage side and the ground side, the stabilization time of the output voltages at the respective stage may be long. In this case, it is likely that the stabilization time is reduced when the switches are arranged one of the power supply voltage side or the ground side. It is recommended that the circuits at the respective stages that execute the intermittent operations according to the control of the switches be constituted by differential circuits that are supplied with differential input signals and generate differential output signals. This is because, since a voltage level of a differential output terminal of the differential circuit at a pre-stage due to on and off of the switches is in-phase, in general, a common mode rejection ratio of the differential circuit at the next stage is high and, therefore, the differential circuit at the next stage is substantially insensitive to an in-phase change of a differential output voltage level of the differential circuit at the pre-stage.

Figure 9:
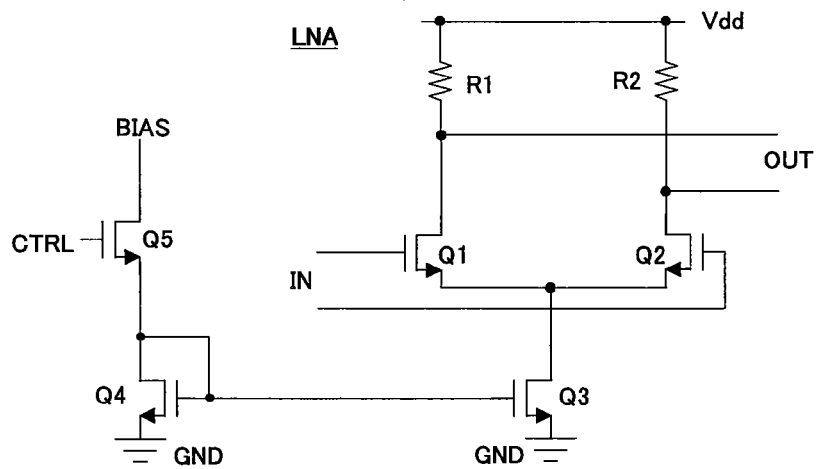
FIG. 9 is a diagram showing a circuit in which a current path is interrupted by control of switches constituting respective stages of a low noise amplifier at a first stage, a mixer at a second stage, a low-pass filter at a third stage, a variable gain amplifier at a fourth stage, and an analog-to-digital converter at a fifth stage of the receiver for the UWB-IR radio communication shown in FIG. 1.

FIG. 9 is a diagram showing a circuit, a current path of which is interrupted by the control of the switches constituting the respective stages of the low noise amplifier 110 at the first stage, the mixers 120 and 121 at the second stage, the low-pass filters 130 and 131 at the third stage, the variable gain amplifiers 140 and 141 at the fourth stage, and the analog-to-digital converters 150 and 151 a the fifth stage of the receiver for the UWB-IR radio communication in FIG. 1. FIG. 9 is an example of the low noise amplifier LNA. The low noise amplifier LNA is constituted by a differential circuit that is supplied with a differential input signal IN and generates a differential output signal OUT. The differential input signal IN is amplified by differential pair transistors Q1 and Q2. The differential output signal OUT is generated by resistors R1 and R2. Bias currents of the differential pair transistors Q1 and Q2 are set by a constant current transistor Q3, a diode connection transistor Q4, a bias transistor Q5 connected to a bias terminal BIAS and a control terminal CTRL. When a control voltage of the control terminal CTRL is set to a low level, the bias transistor Q5 is turned off and the bias currents of the differential pair transistors Q1 and Q2 are interrupted. Therefore, the constant current transistor Q3 also functions as a current interrupting switch on the ground GND side.

Figure 10:
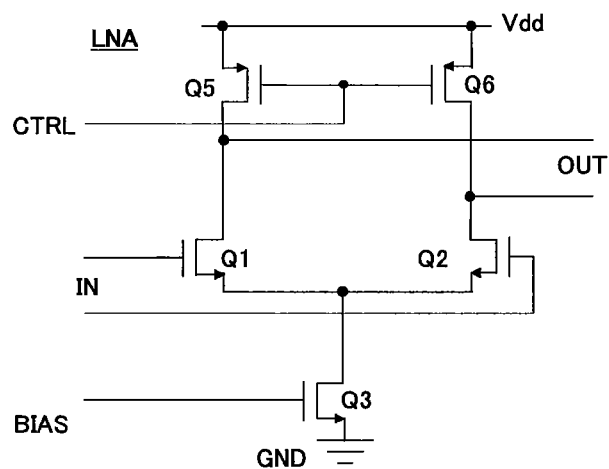
FIG. 10 is a diagram showing another example of the circuit in which a current path is interrupted by control of the switches constituting the respective stages of the low noise amplifier at the first stage, the mixer at the second stage, the low-pass filter at the third stage, the variable gain amplifier at the fourth stage, and the analog-to-digital converter at the fifth stage of the receiver for the UWB-IR radio communication shown in FIG. 1.

FIG. 10 is a diagram showing another example of the circuit, the current path of which is interrupted by the control of the switches constituting the respective stages of the low noise amplifier 110 at the first stage, the mixers 120 and 121 at the second stage, the low-pass filters 130 and 131 at the third stage, the variable gain amplifiers 140 and 141 at the fourth stage, and the analog-to-digital converters 150 and 151 a the fifth stage of the receiver for the UWB-IR radio communication in FIG. 1. FIG. 10 is also an example of the low noise amplifier LNA. The low noise amplifier LNA is constituted by a differential circuit that is supplied with the differential input signal IN and generates the differential output signal OUT. The differential input signal IN is amplified by the differential pair transistors Q1 and Q2. The differential output signal OUT is generated by the load transistors Q5 and Q6. Bias currents of the differential pair transistors Q1 and Q2 are set according to an electric current of the constant current transistor Q3 biased by a fixed bias voltage BIAS. When the low noise amplifier LNA is in the active state, a control voltage CTRL at a fixed voltage level slightly lower than the power supply voltage Vdd is supplied to gates of the load transistors Q5 and Q6. When the low noise amplifier LNA in FIG. 10 is brought into the disable state, the control voltage CTRL is set to the level of the power supply voltage Vdd, the load transistors Q5 and Q6 are turned off, and electric currents of the differential pair transistors Q1 and Q2 are interrupted. Therefore, the load transistors Q5 and Q6 also function as current interrupting switches on the power supply voltage Vdd side.

Figure 11:
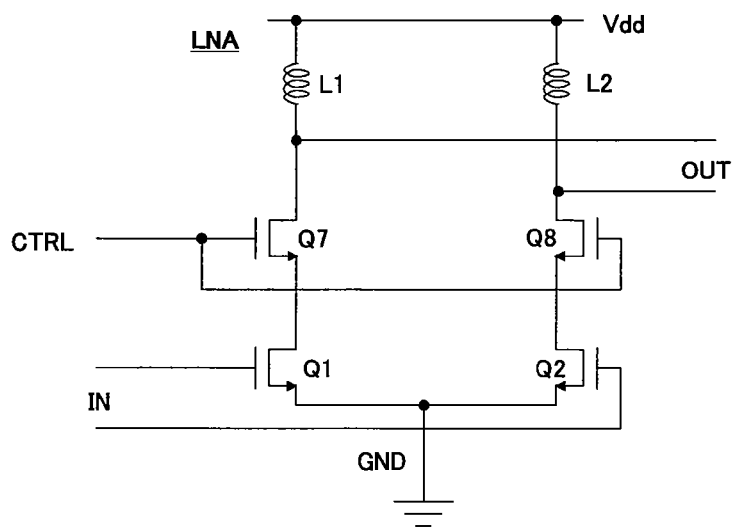
FIG. 11 is a diagram showing still another example of the circuit in which a current path is interrupted by control of the switches constituting the respective stages of the low noise amplifier at the first stage, the mixer at the second stage, the low-pass filter at the third stage, the variable gain amplifier at the fourth stage, and the analog-to-digital converter at the fifth stage of the receiver for the UWB-IR radio communication shown in FIG. 1.

FIG. 11 is a diagram showing still another example of the circuit, the current path of which is interrupted by the control of the switches constituting the respective stages of the low noise amplifier 110 at the first stage, the mixers 120 and 121 at the second stage, the low-pass filters 130 and 131 at the third stage, the variable gain amplifiers 140 and 141 at the fourth stage, and the analog-to-digital converters 150 and 151 a the fifth stage of the receiver for the UWB-IR radio communication in FIG. 1. FIG. 11 is also an example of the low noise amplifier LNA. The low noise amplifier LNA is constituted by a differential circuit that is supplied with the differential input signal IN and generates the differential output signal OUT. The differential input signal IN is amplified by the differential pair transistors Q1 and Q2. The differential output signal OUT is generated by load coils L1 and L2 via cascaded transistors Q7 and Q8, to gates of which the control voltage CTRL at a fixed voltage level is supplied. The cascaded transistors Q7 and Q8 have a function of reducing a negative feedback amount of a high-frequency signal of a differential output signal OUT of the load coils L1 and L2 fed back to gate inputs of the differential pair transistors Q1 and Q2. Therefore, the low noise amplifier LNA shown in FIG. 11 has an extremely satisfactory high-frequency characteristic. When the low noise amplifier LNA is in the active state, the control voltage CTRL at a fixed voltage level is supplied to gates of the cascaded transistors Q7 and Q8. When the low noise amplifier LNA in FIG. 11 is brought into the disable state, the control voltage CTRL is set to the level of the ground GND voltage, the cascaded transistors Q7 and Q8 are turned off, and electric currents of the differential pair transistors Q1 and Q2 are interrupted. Therefore, the cascaded transistors Q7 and Q8 function as current interrupting switches on the ground GND side viewed from the differential output signal OUT and also functions as current interrupting switches on the power supply voltage Vdd side viewed from the differential pair transistors Q1 and Q2.

As explained above, according to the first embodiment of the present invention, the operation-timing control unit 190 causes the circuits 110, 120, 121, 130, 131, 140, 141, 150, and 151 at the respective stages to intermittently operate, whereby it is possible to reduce power consumption of the entire receiver. It is possible to further reduce power consumption by individually setting the timings of the start of the operation and the stop of the operation on the basis of stabilization times and transmission delay times of the circuits at the respective stages. Intermittent operations are possible not only after the synchronous acquisition but also during standby by delaying a clock signal, timing of which is set on the basis of results of the synchronous acquisition and the synchronous tracking, and generating an intermittent operation control signal.

It is possible to reduce stabilization times of the circuits at the respective stages by arranging the switches for the interruption of the current path alternately on the power supply side and the ground side viewed from the output terminals of the cascaded circuits at the respective stages. Since it is possible to reduce the operation periods of the circuits at the respective stages, it is possible to further reduce power consumption.

Second Embodiment

Figure 12:
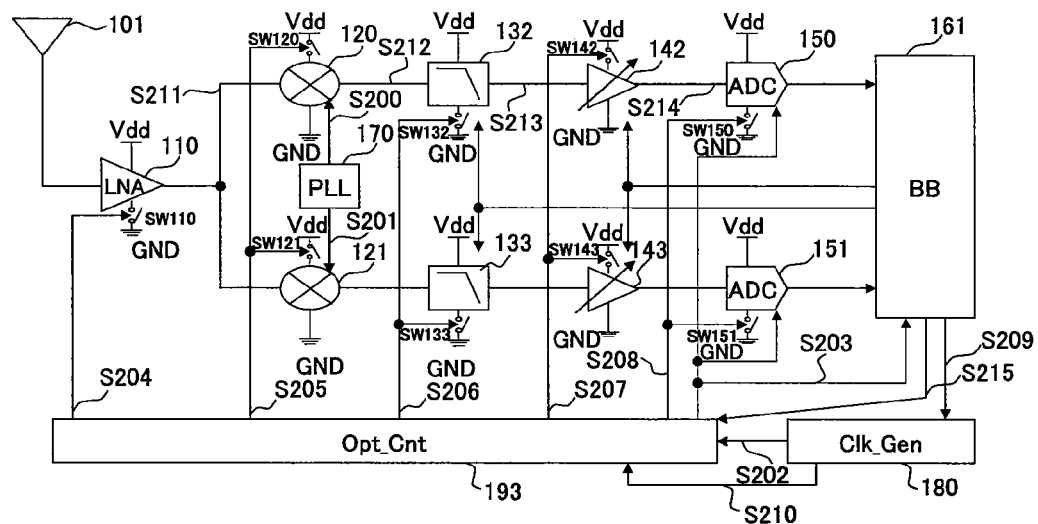
FIG. 12 is a block diagram showing an example of a structure of a receiver for the UWB-IR radio communication according to a second embodiment of the present invention.

FIG. 12 is a block diagram showing an example of a structure of a receiver for the UWB-IR radio communication according to a second embodiment of the present invention. Explanations of components common to the first embodiment are omitted.

The receiver according to the second embodiment includes the reception antenna 101, the low noise amplifier 110, the mixers 120 and 121, low-pass filters 132 and 133, variable gain amplifiers 142 and 143, the analog-to-digital converters 150 and 151, a baseband processing unit 161, a phase locked loop 170, the clock generating unit 180, and an operation-timing control unit 193.

A frequency spectrum of an impulse signal in the UWB-IR radio communication is an ultra-high frequency and signal with a center frequency of about 4 GHz and a frequency bandwidth of about 500 MHz as described above. However, the frequency bandwidth of about 500 MHz in the UWB-IR radio communication may be different depending on laws and regulations and radio wave use environments in various countries.

Figure 13:
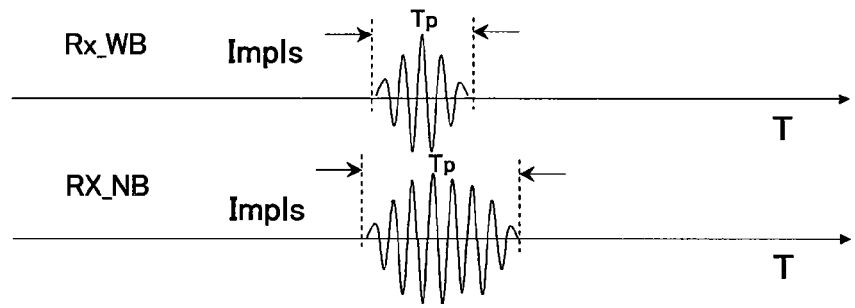
FIG. 13 is a waveform chart for explaining a difference in impulse reception signals due to a difference in frequency bandwidths of about 500 MHz of an impulse signal used in the UWB-IR radio communication.

FIG. 13 is a waveform chart for explaining a difference in an impulse reception signal due to a difference in the frequency bandwidth of about 500 MHz of the impulse signal used in the UWB-IR radio communication. As shown in the upper section of the figure, when a frequency bandwidth in use is wide, the pulse width Tp of the impulse reception signal Impls is narrow. When a frequency bandwidth in use is narrow, conversely, as shown in the lower section of the figure, the pulse width Tp of the impulse reception signal Impls is wide.

In the receiver for the UWB-IR radio communication shown in FIG. 12, the low-pass filters 132 and 133 have an important function of inhibiting a disturbing wave in a reception signal mixed with a disturbing wave of about 1 GHz generated by the 5 GHz radio LAN or the like and, on the other hand, extracting the impulse reception signal Impls of the UWB-IR radio communication of about 500 MHz, which is a desired frequency band, from the reception signal. Therefore, in the receiver for the UWB-IR radio communication shown in FIG. 12, when a frequency bandwidth of the impulse signal used in the UWB-IR radio communication is a narrow frequency band extremely narrower than about 500 MHz because of the difference, the cutoff frequency fc of the low-pass filters 132 and 133 is set to a frequency as low as, for example, about 300 MHz to cope with the narrow frequency band. Conversely, when a frequency band width of the impulse signal used in the UWB-IR radio communication is a wide frequency band as wide as about 500 MHz, the cutoff frequency fc of the low-pass filters 132 and 133 is set to a frequency as high as, for example, about 350 MHz to cope with the wide frequency band. The switching of the level of the cutoff frequency fc of the low-pass filters 132 and 133 is possible according to, for example, mode setting during power-on of the receiver for the UWB-IR radio communication shown in FIG. 12.

The difference in the level of the cutoff frequency fc of the low-pass filters 132 and 133 affects a difference in length of propagation delay times of the low-pass filters 132 and 133. When the cutoff frequency fc of the low-pass filters 132 and 133 is a high frequency, the propagation delay times of the low-pass filters 132 and 133 are short. When the cutoff frequency fc of the low-pass filters 132 and 133 is a low frequency, the propagation delay times of the low-pass filters 132 and 133 are large. Therefore, in the receiver for the UWB_IR radio communication shown in FIG. 12, when the cutoff frequency fc of the low-pass filters 132 and 133 is set to a low frequency, intermittent operation timing of the low-pass filters 132 and 133 and the variable gain amplifiers 142 and 143 and the analog-to-digital converters 150 and 151 at the post stage of the low-pass filters 132 and 133 is further delayed than intermittent operation timing of the low noise amplifiers 110 and the mixers 120 and 121. Conversely, when the cutoff frequency fc of the low-pass filters 132 and 133 is set to a high frequency, the operation periods of the intermittent operations of the circuit at the respective stages constituting the receiver for the UWB-IR radio communication shown in FIG. 12 are controlled to be shorter. Thus, it is possible to further reduce power consumption.

In the receiver for the UWB-IR radio communication shown in FIG. 12, the baseband processing unit 161 detects, on the basis of digital baseband signals of the outputs of the analog-to-digital converters 150 and 151, whether analog baseband signals of the outputs of the low-pass filters 132 and 133 include high frequency components of about 350 MHz. Therefore, when the baseband processing unit 161 detects that the analog baseband signals of the outputs of the low-pass filters 132 and 133 include high-frequency components of about 350 MHz, the baseband processing unit 161 controls the cutoff frequency fc of the low-pass filters 132 and 133 to be a high frequency. Simultaneously with this control, the baseband processing unit 161 controls operation periods of intermittent operations of the circuits at the respective stages constituting the receiver for the UWB-IR radio communication shown in FIG. 12 to be a short time according to the control of the timing of the intermittent operation control signals S204, S205, S206, S207, and S208 and realizes a further reduction in power consumption. Conversely, when the baseband processing unit 161 detects that the analog baseband signals of the outputs of the low-pass filters 132 and 133 do not include high frequency components of about 350 MHz, the baseband processing unit 161 controls the cutoff frequency fc of the low-pass filters 132 and 133 to be a low frequency. The baseband processing unit 161 controls the operation period of the intermittent operations of the circuits at the respective stages constituting the receiver for the UWB-IR radio communication shown in FIG. 12 to be a long time.

In order to cause the receiver for the UWB-IR radio communication shown in FIG. 12 to cope with not only the short distance communication but also the medium distance communication and the long distance communication, the baseband processing unit 161 controls gains of the variable gain amplifiers 142 and 143 on the basis of digital baseband signals of the outputs of the analog-to-digital converters 150 and 151. When a reception level of the impulse reception signal Impls is high, the baseband processing unit 161 reduces biases of the variable gain amplifiers 142 and 143 to control an amplification gain to be small and reduces power consumption of the variable gain amplifiers 142 and 143.

Figure 14:
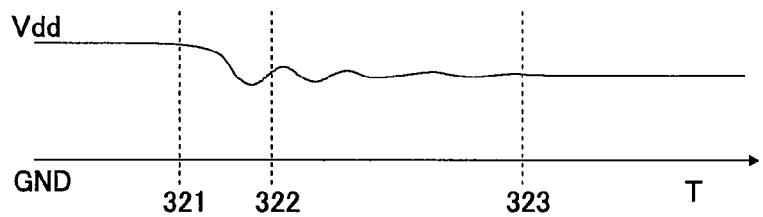

FIG. 14 is a waveform chart in a period until an output signal is stabilized after current interrupting switches at the respective stages of the low noise amplifier 110 at the first stage, the mixers 120 and 121 at the second stage, the low-pass filters 132 and 133 at the third stage, the variable gain amplifiers 142 and 143 at the fourth stage, and the analog-to-digital converters 150 and 151 at the fifth stage of the receiver for the UWB-IR radio communication shown in FIG. 12 are turned on.

For example, it is assumed that circuits are the low-pass filters 132 and 133 and the switch of the low-pass filter 132 is turned on at timing 321. Then, the output signal S213 falls from the power supply voltage Vdd to a predetermined stabilized voltage in a certain elapsed time. The output signal S213 may oscillate up and down during this elapsed time. Since this oscillation changes to noise, a level of allowable oscillation is determined according to a level of an input signal supplied to the circuits.

When a level of the input signal S212 of the low-pass filter 132 is high, the level of the allowable oscillation of the output signal S213 is also high. Therefore, in this case, in response to the input signal S212 of a high level supplied after relatively early timing 322 after the current interrupting switch SW132 of the low-pass filer 132 is turned on at timing 321, the low-pass filter 132 outputs a low-pass output signal S213. Compared with a level of this low-pass output signal S213, an oscillation level at the relatively early timing 322 of the output of the low-pass filter 132 due to the turn-on of the current interrupting switch SW132 can be neglected.

However, when a level of the input signal S212 of the low-pass filter 132 is low, a level of the allowable oscillation of the output signal S213 is low. Therefore, in this case, in response to the input signal S212 of a low level supplied after relatively late timing 323 after the current interrupting switch SW132 of the low-pass filer 132 is turned on at the timing 321, the low-pass filter 132 outputs the low-pass output signal S213. Compared with a level of this low-pass output signal S213, an oscillation level at the relatively late timing 323 of the output of the low-pass filter 132 due to the turn-on of the current interrupting switch SW132 can be neglected.

Therefore, when a reception level of an impulse reception signal received by the receiver for the UWB-IR radio communication is low and an amplification gain of the variable gain amplifier 142 is controlled to be a large value by the baseband processing unit 193, it is necessary to secure a long stabilization time until a level of the low-pass output signal S213 is stabilized after the current interrupting switch SW132 of the low-pass filter 132 is turned on. Therefore, timing for turning on the current interrupting switch SW132 of the low-pass filter 132 has to be set early. Conversely, when a reception level of an impulse reception signal received by the receiver for the UWB-IR radio communication is high and an amplification gain of the variable gain amplifier 142 is controlled to be a small value by the baseband processing unit 193, it is possible to secure a short stabilization time until a level of the low-pass output signal S213 is stabilized after the current interrupting switch SW132 of the low-pass filter 132 is turned on. Therefore, it is possible to set timing for turning on the current interrupting switch SW132 of the low-pass filter 132 late, reduce operation periods of the intermittent operations of the circuits at the respective stages, and reduce power consumption.

When amplification gains of the variable gain amplifiers 142 and 143 are large, since a bias current is large, a transmission delay time is short. Therefore, when the amplification gains of the variable gain amplifiers 142 and 143 are large, since it is possible to delay intermittent operation timing of the variable gain amplifiers 142 and 143 and the analog-to-digital converters 150 and 151 at the post stage of the variable gain amplifiers 142 and 143, it is possible to further reduce power consumption.

When the baseband processing unit 161 detects that the analog baseband signals of the outputs of the low-pass filters 132 and 133 do not include high-frequency components of about 350 MHz and controls operation periods of the intermittent operations of the circuits at the respective stages constituting the receiver for the UWB-IR radio communication shown in FIG. 12 to be an extremely long time, it is also possible to stop the intermittent operations of the circuits at the respective stages and switch the intermittent operations to normal operations.

When gains and frequency characteristics of the circuits at the respective stages such as the low noise amplifier 110, the mixers 120 and 121, the analog-to-digital converters 150 and 151, and the phase locked loop 170 are controlled according to the control by the baseband processing unit 161 and transmission delay times and stabilization times of the circuits at the respective stages change, it is recommended that this second embodiment be applied. The structure of the receiver for the UWB-IR radio communication shown in FIG. 12 is merely an example. It is also possible to add filers, amplifiers, and the like among the stages of the circuits at the respective stages or delete a part of the circuits. Even in this case, it is possible to reduce power consumption by applying the second embodiment and perform intermittent operations in the circuits at the respective stages.

Figure 15:
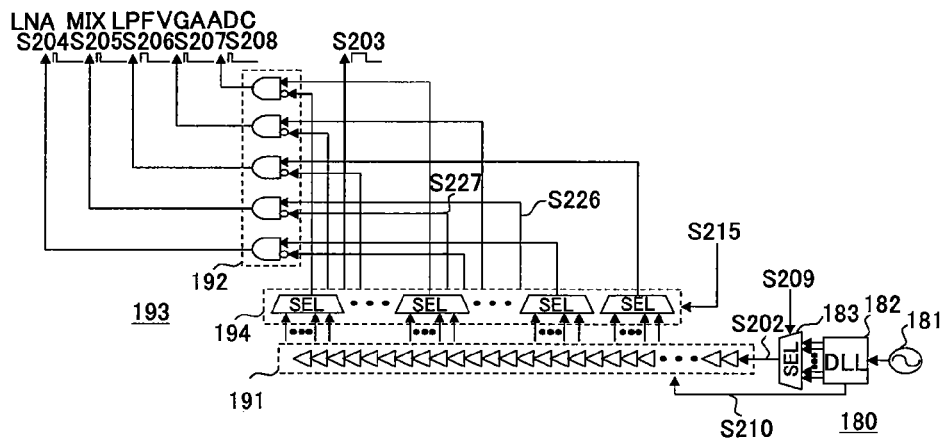
FIG. 15 is a block diagram showing a structure of an operation-timing control unit and a clock generating unit of the receiver for the UWB-IR radio communication shown in FIG. 12.

FIG. 15 is a block diagram showing a structure of the operation-timing control unit 193 and the clock generating unit 180 of the receiver for the UWB-IR radio communication shown in FIG. 12. The operation-timing control unit 193 includes the delay circuit row 191, the logic circuit 192, and a selector 194. The clock control unit 180 includes the oscillator 181, the delay lock loop 182, and the selector 183.

Compared with the operation-timing control unit 190 shown in FIG. 5, in the operation-timing control unit 193 shown in FIG. 15, a selector 194 controlled by a control signal S215 generated by the baseband processing unit 161 is added.

The control signal S215 generated by the baseband processing unit 161 is a detection result that the baseband processing unit 161 obtains by detecting whether the analog baseband signals of the outputs of the low-pass filers 132 and 133 include high-frequency components of about 350 MHz on the basis of the digital baseband signals of the outputs of the analog-to-digital converters 150 and 151. When the baseband processing unit 161 detects that the analog base band signals of the outputs of the low-pass filters 132 and 133 include high-frequency components of about 350 MHz, the baseband processing unit 161 controls the cutoff frequency fc of the low-pass filters 132 and 133 to be a high frequency. Simultaneously with this control, the selector 194 controlled by the control signal S215 generated by the baseband processing unit 161 selects delay signals of plural intermediate taps of the delay circuit row 191. Thus, it is possible to control timing of the intermittent operation control signals S204, S205, S206, S207, and S208, control operation periods of the intermittent operations of the circuits at the respective stages constituting the receiver for the UWB-IR radio communication shown in FIG. 12 to be a short time, and realize a further reduction in power consumption.

Third Embodiment

Figure 16:
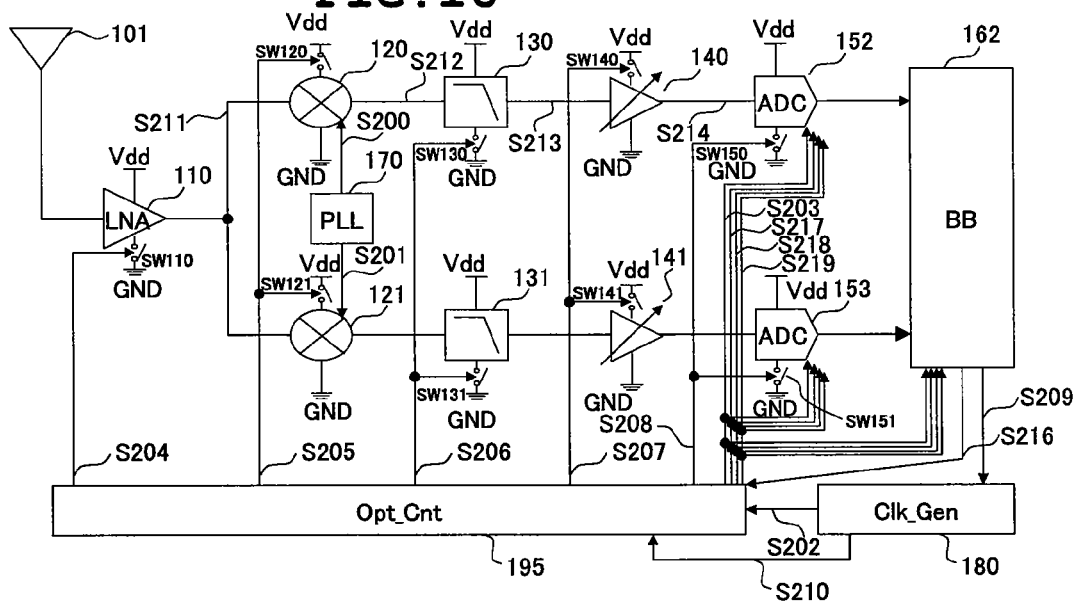
FIG. 16 is a block diagram showing an example of a structure of a receiver for the UWB-IR radio communication according to a third embodiment of the present invention.

FIG. 16 is a block diagram showing an example of a structure of a receiver for the UWB-IR radio communication according to a third embodiment of the present invention. Explanations of components common to the first and second embodiments are omitted.

The receiver according to the third embodiment includes the reception antenna 101, the low noise amplifier 110, the mixers 120 and 121, the low-pass filters 130 and 131, the variable gain amplifiers 140 and 141, analog-to-digital converters 152 and 153, a baseband processing unit 162, the phase locked loop 170, the clock generating unit 180, and an operation-timing control unit 195.

The operation-timing control unit 195 outputs, on the basis of a control signal S216 from the baseband processing unit 162, the clock signals S203, S205, S206, and S207 to the low noise amplifier 110, the mixers 120 and 121, the low-pass filters 130 and 131, and the variable gain amplifiers 140 and 141 and outputs clock signals S217, S218, and S219 to plural analog-to-digital converters constituting the analog-to-digital converters 152 and 153 and the baseband processing unit 162. Like the control signal S215 generated by the baseband processing unit 161 shown in FIG. 12, the control signal S216 from the baseband processing unit 162 shown in FIG. 16 also includes a detection result that the baseband processing unit 162 obtains by detecting whether the analog baseband signals of the outputs of the low-pass filers 130 and 131 include high-frequency components of about 350 MHz on the basis of the digital baseband signals of the outputs of the analog-to-digital converters 152 and 153. However, besides, the control signal S216 from the baseband processing unit 162 also includes, as indicated by a waveform chart in FIG. 17, information on synchronous acquisition of the receiver for the UWB-IR radio communication shown in FIG. 16 performed by using the reception data Rx_Data of the preamble data Preamble transferred before the transfer of the payload data Data in the UWB-IR radio communication.

Figure 17:
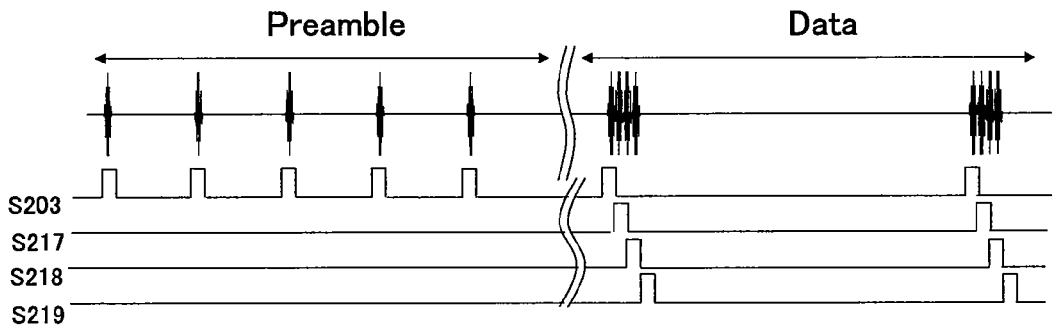
FIG. 17 is a waveform chart showing a reception impulse of preamble data transferred before transfer of payload data in the UWB-IR radio communication, the waveform chart explaining synchronous acquisition of the receiver for the UWB-IR radio communication shown in FIG. 16.

FIG. 17 is a waveform chart showing a reception impulse of the preamble data Preamble transferred before the transfer of the payload data Data in the UWB-IR radio communication, the waveform chart explaining synchronous acquisition of the receiver for the UWB-IR radio communication shown in FIG. 16. In a reception period of the preamble data Preamble, timing of arrival of impulses of the preamble data is substantially a fixed interval. In a reception period of the payload data Data, four impulses of the payload data arrive continuously. An interval between an arrival period of the four impulse pulses and an arrival period of the next four impulses is substantially fixed at about 30 nano-seconds. The number of continuously arriving impulses is not limited to four. It is also possible to increase the number of continuously arriving impulses by changing a communication speed and an average pulse repetition period in order to improve a transfer rate.

In the state in which the receiver for the UWB-IR radio communication shown in FIG. 16 is receiving a reception impulse of the preamble data Preamble, as shown in FIG. 17, in response to the control signal S216 from an output of the baseband processing unit 162, the operation-timing control unit 195 outputs only the clock signal S203 and fixes the other clock signals S217, S218, and S219 to a power supply voltage or a ground voltage. Therefore, the analog-to-digital converters 152 and 153 sample analog baseband signals, which are preamble data of the outputs of the variable amplifiers 140 and 141, at timing of the clock signal 203 and converts the analog baseband signals into digital baseband signals, which are preamble data. The baseband processing unit 162 captures output signals of the analog-to-digital converters 152 and 153 in synchronization with the clock signal S203 and performs synchronous acquisition and synchronous tracking. The baseband processing unit 162 outputs the control signal S209 to the clock generating unit 180 on the basis of results of the synchronous acquisition and the synchronous tracking.

In the state in which the receiver for the UWB-IR radio communication finishes the reception of the reception impulse of the preamble data Preamble and is receiving a reception impulse of the payload data Data, as shown in FIG. 17, in response to the control signal S216 from the output of the baseband processing unit 162, the operation-timing control unit 195 outputs the four clock signals S203, S217, S218, and S219. Intervals of the clock signals S203, S217, S218, and S219 are set to coincide with intervals of continuously arriving reception impulses of the payload data Data corresponding to the intervals of the clock signals. Each of the plural analog-to-digital converters constituting the analog-to-digital converters 152 and 153 samples analog baseband signals, which are payload data, at timing of clock signals corresponding to the plural clock signals S203, S217, S218, and S219 and converts the analog baseband signals into digital baseband signals, which are payload data. The baseband processing unit 162 captures, in a pipeline manner, plural digital baseband signals, which are payload data, from the plural analog-to-digital converters constituting the analog-to-digital converters 152 and 153 at timing of the four clock signals S203, S217, S218, and S219 and performs baseband signal processing in the pipeline manner.

In this third embodiment, clock signals from the operation-timing control unit 195 are the four signals S203, S217, S218, and S219. However, in the present invention, these clock signals are not always limited to the four signals. It is also possible to adopt two signals, sixteen signals, and other numbers of signals according to systems.

Figure 18:
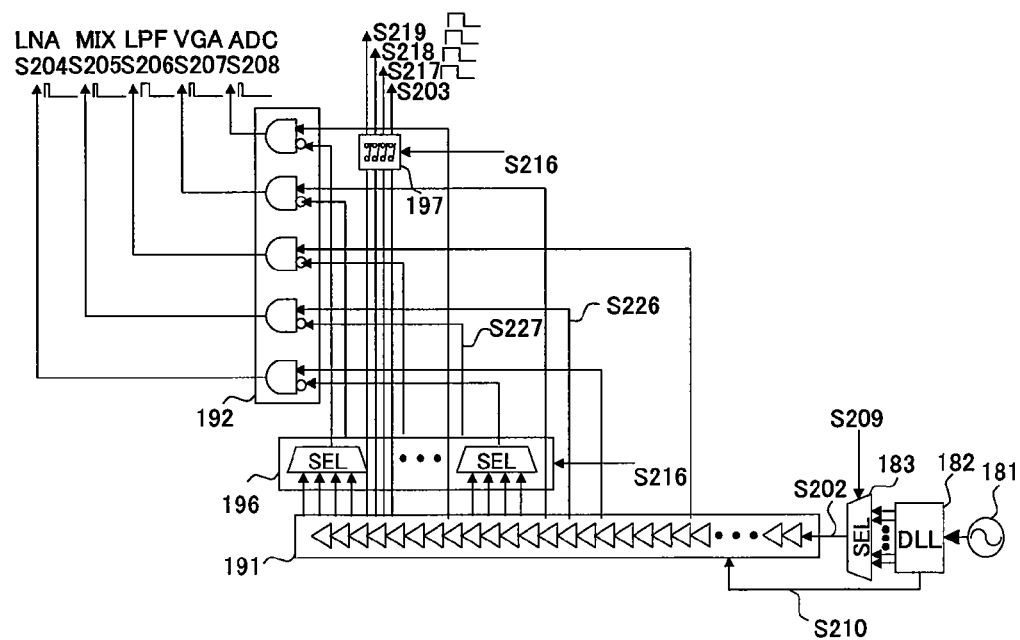
FIG. 18 is a block diagram showing the structure of the operation-timing control unit and the clock generating unit of the receiver for the UWB-IR radio communication shown in FIG. 15.

FIG. 18 is a block diagram showing a structure of the operation-timing control unit 195 and the clock generating unit 180 of the receiver for the UWB-IR radio communication shown in FIG. 15. The operation-timing control unit 195 includes the delay circuit row 191, the logic circuit 192, and a selector 196. The clock generating unit 180 includes the oscillator 181, the delay lock loop 182, and the selector 183.

Compared with the operation-timing control unit 190 shown in FIG. 5, in the operation-timing control unit 195 shown in FIG. 18, the selector 196 controlled by the control signal S216 generated by the baseband processing unit 162 is added. The selector 196 controlled by the control signal S216 generated by the baseband processing unit 162 controls timing of the intermittent operation control signals S204, S205, S206, S207, and S208 by selecting delay signals of appropriate plural intermediate taps of the delay circuit row 191.

Moreover, the plural delay signals from the delay circuit row 191 are supplied to a switch 197 and selected by the control signal S216 generated by the baseband processing unit 162. The delay signals selected by the switch 17 are outputted as the clock signals S203, S217, S218, and S219 to the analog-to-digital converters 152 and 153 and the baseband processing unit 162.

For example, in the case of the reception period of the reception impulse of the preamble data Preamble shown in FIG. 17, the switch 197 outputs only the clock signal S203 according to the control by the control signal S216. In the case of the reception period of the reception impulse of the payload data Data shown in FIG. 17, the switch 197 outputs the clock signals S203, S217, S218, and S219 according to the control by the control signal S216.

Moreover, the selector 196 switches, in the preamble reception period and the payload data reception period, operation timing to match the number of pulses received in one operation period according to the control by the control signal S216 generated by the baseband processing unit 162. In the preamble reception period, the selector 196 selects operation timing for receiving one impulse. In the payload data reception period, the selector 196 selects operation timing for receiving continuous four impulses. A signal for determining timing for stopping the selection operation in the selector 196 is a clock signal at latest timing. In the preamble reception period, the clock signal at the latest timing is determined by the clock signal S203. In the payload reception period, the clock signal at the latest timing is determined by the clock signal S219.

As described above, according to this third embodiment, the operation-timing control unit 195 can change an intermittent operation control signal and a clock signal on the basis of the number of continuously arriving reception pulses and perform an appropriate impulse reception operation.

Fourth Embodiment

Figure 19:
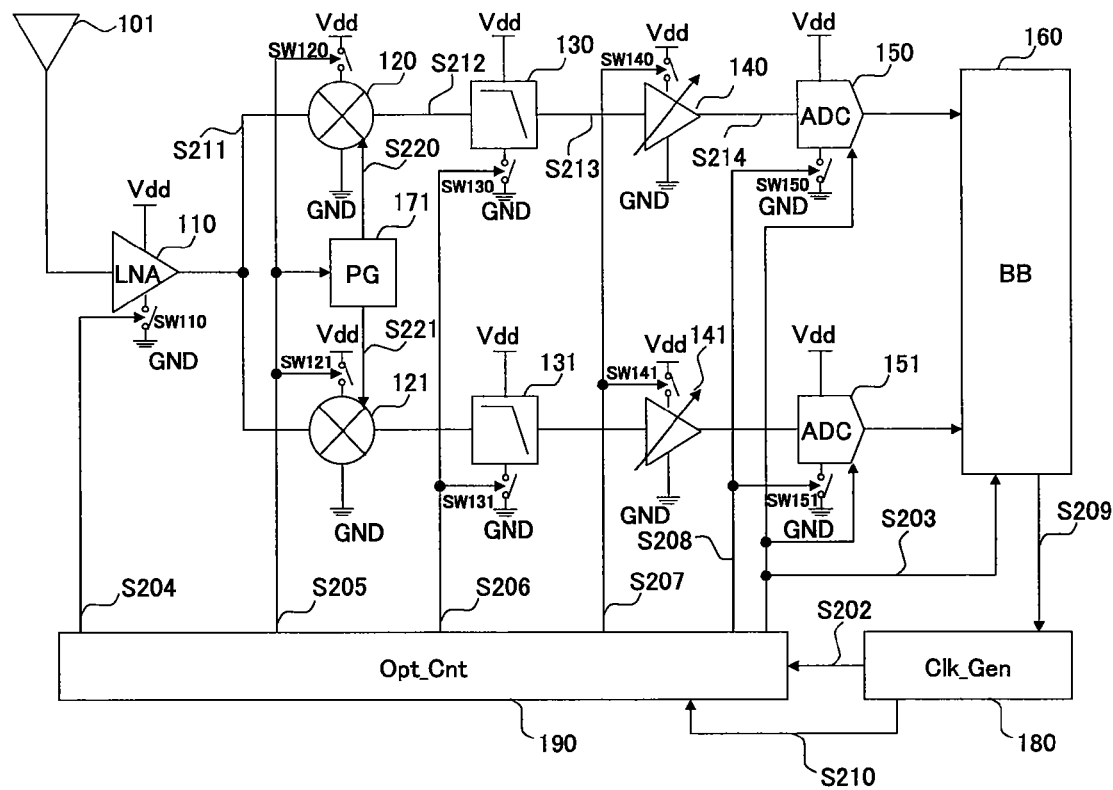
FIG. 19 is a block diagram showing an example of a structure of a receiver for the UWB-IR radio communication according to a fourth embodiment of the present invention.

FIG. 19 is a block diagram showing an example of a structure of a receiver for the UWB-IR radio communication according to a fourth embodiment of the present invention. Explanations of components common to those in the first, second, and third embodiments are omitted.

As a characteristic of the receiver for the UWB-IR radio communication according to the fourth embodiment shown in FIG. 19, whereas the local signals S200 and S201 supplied to the mixers 120 and 121 are formed by the phase locked loop 170 in the embodiments described above, local signals S220 and S221 supplied to the mixers 120 and 121 are formed by a pulse generator 171 in the receiver shown in FIG. 19.

Therefore, the receiver according to the fourth embodiment includes the reception antenna 101, the low noise amplifier 110, the mixers 120 and 121, the low-pass filters 130 and 131, the variable gain amplifiers 140 and 141, the analog-to-digital converters 150 and 151, the baseband processing unit 160, the pulse generator 171, the clock generating unit 180, and the operation-timing control unit 190.

An impulse reception signal received by the reception antenna 101 is amplified by the low noise amplifier 110. The amplified signal of the low noise amplifier 110 is multiplied by the local signals S220 and S221 outputted from the pulse generator 171 in the mixers 120 and 121, a frequency of the amplified signal is converted, and an analog baseband signal is formed. When the intermittent operation control signal S205 for controlling an operation period of the mixers 120 and 121 is supplied to the pulse generator 171, the local signals S220 and S221 are formed by the pulse generator 171. Timings of pulses of the local signals S220 and S221 are different by 90 degrees like the phases of the local signals S200 and S201 in the embodiments described above.

Figure 20:
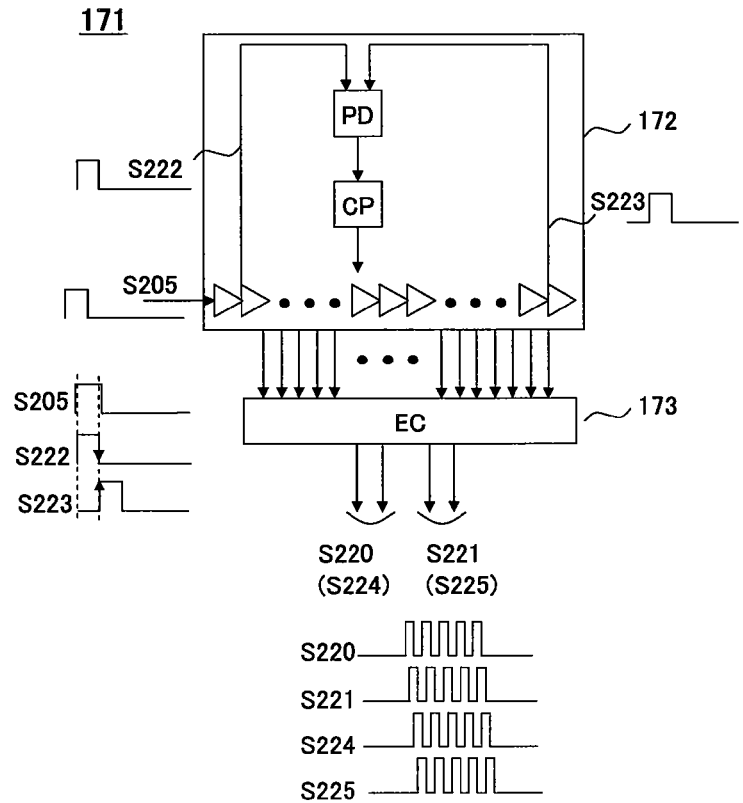
FIG. 20 is a block diagram showing a structure of a pulse generator of the receiver for the UWB-IR radio communication shown in FIG. 19.

FIG. 20 is a block diagram showing a structure of the pulse generator 171 of the receiver for the UWB-IR radio communication shown in FIG. 19. As shown in the figure, the pulse generator 171 includes a delay lock loop 172 and an edge combiner 173. The intermittent operation control signal S205 supplied to the mixers 120 and 121 is supplied to the delay lock loop 172 of the pulse generator 171. In the delay lock loop 172, a phase comparator PD and a charge pump CP negatively feedback-controls delay times of plural delay circuits of a delay circuit row connected in series such that a phase of an output signal S222 of a delay circuit at a first stage of the delay circuit row serially connected and a phase of an input signal S223 of a delay circuit at a last stage coincide with each other. For example, the negative feedback control is performed such that a falling edge of the output signal S222 of the delay circuit at the first stage and a rising edge of the input signal S223 of the delay circuit at the last stage synchronize with each other. In this way, compared with the case in which the rising edge of the signal S222 and the rising edge of the signal S223 are synchronized, it is possible to reduce the number of serially connected delay circuits. This is because, when the rising edges of both the signals are synchronized, a delay circuit row for a delay time of one period of the intermittent operation control signal S205 for the mixers 120 and 121 is necessary but, if timing are adjusted at the rising edge and the falling edge, a delay circuit row for a delay time corresponding to an operation period (a high level period of the signal S205) in which the intermittent operation control signal S205 causes the mixers 120 and 121 to operate is enough.

Delay times of the respective delay circuits of the delay circuit row of the delay lock loop 172 only has to be a degree enough for generating the timing difference of 90° of the local signals S220 and S221. The edge combiner 173 combines plural delay output signals supplied from the delay lock loop 172 to form the local signals S220 and S221. In FIG. 20, the local signals S220 and S221 are differential complementary signals S220 (S224) and S221 (S225). When the local signals S220 and S221 of these differential complementary signals are generated, the signal S224 of a phase opposite to that of the signal S220 and the signal S225 of a phase opposite to that of the signal S221 only have to be generated from an output of the edge combiner 173.

The signal waveforms of the local signals S220 and S221 described above are merely examples. The number cycles of pulses of the local signals S220 and S221 is not limited to this. The number of cycles of the pulses is set to satisfy an operation period of the intermittent operations of the mixers 120 and 121. Alternatively, it is also possible to set the number of cycles such that pulses are present only in a part of the operation period of the mixers 120 and 121.

Figure 21:
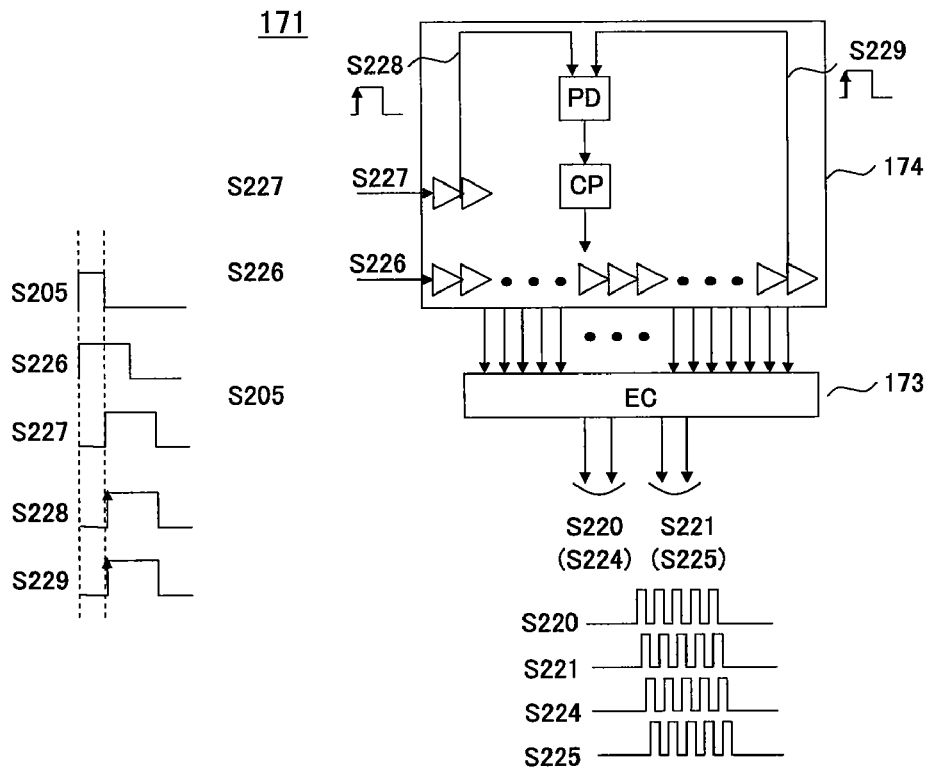
FIG. 21 is a block diagram showing another structure of the pulse generator of the receiver for the UWB-IR radio communication shown in FIG. 19.

FIG. 21 is a block diagram showing another structure of the pulse generator 171 of the receiver for the UWB-IR radio communication shown in FIG. 19. Although not clearly shown in FIGS. 19 and 21, the operation-timing control unit 190 generates the intermittent operation control signal S205 for the mixers 120 and 121 from an operation start timing signal S226 and an operation stop timing signal S227 of the mixers 120 and 121. The operation-timing control unit 190 generates a delay signal S228 by supplying the operation start timing signal S226 to an input of the delay circuit at the first stage of the delay circuit row of the delay lock loop 174 and supplying the operation stop timing signal S227 to an input of another delay circuit. The phase comparator PD and the charge pump CP of the delay lock loop 174 control a delay time of the delay circuit row such that timing of the delay signal S229 of the input of the delay circuit at the final stage of the delay circuit row and timing of the delay signal S228 of the output of the another delay circuit synchronize with each other. In this case, the control is performed such that timings of rising edges or falling edges of both the signals S228 and S229 synchronize with each other. As a result, a timing error due to a difference in a time width of a slope between the rising edges or the falling edges does not occur. Thus, it is possible to highly accurately adjust the timing.

Figure 22:
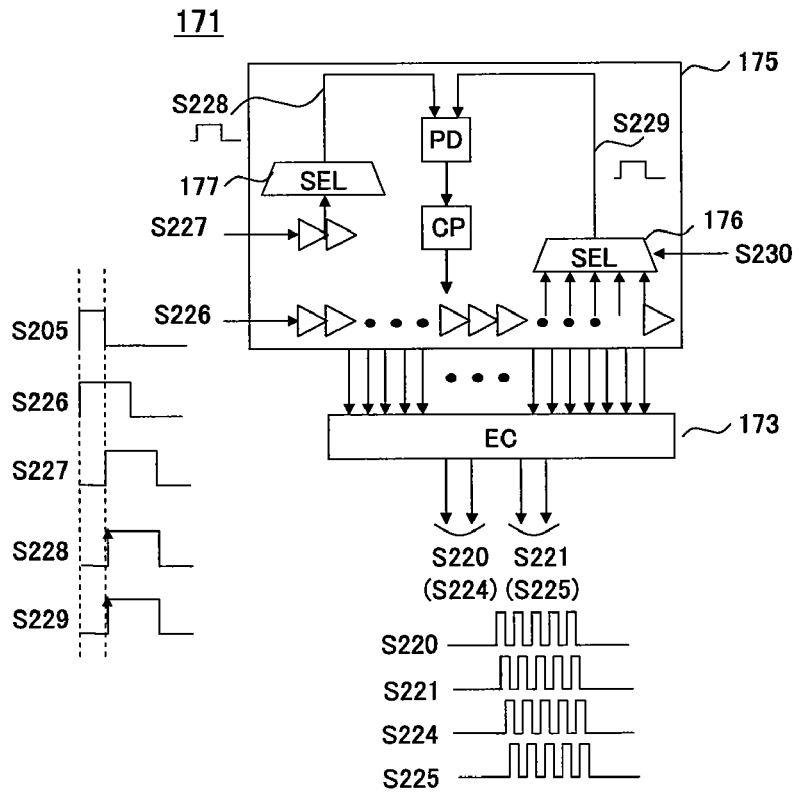
FIG. 22 is a block diagram showing still another structure of the pulse generator of the receiver for the UWB-IR radio communication shown in FIG. 19.

FIG. 22 is a block diagram showing still another structure of the pulse generator 171 of the receiver for the UWB-IR radio communication shown in FIG. 19. In FIG. 22, as in the second and third embodiments described above, the pulse generator 171 copes with a change in an operation period in the intermittent operations of the mixers 120 and 121. The baseband processing unit 160 generates a control signal S230 indicating the length of the operation period of the mixers 120 and 121. In response to this control signal S230, the selector 176 selects a delay signal having an appropriate delay time from the delay taps of the delay circuit row and supplies the delay output signal S229 to the phase comparator PD. The control signal S230 outputted from the baseband processing units 160, 161, and 162 not shown in FIGS. 12, 16, and 19 includes information on the length of the operation period of the mixers 120 and 121. Thus, in response to the control signal S230, the selector 176 selects an appropriate delay signal as the delay output signal S229 and outputs the delay signal. A dummy selector 177 to which the operation stop timing signal S227 is supplied via the another delay circuit is a circuit added for the purpose of canceling the delay time in the selector 176 included in the delay output signal S229 outputted from the selector 176. Therefore, a true function of a selector for selecting and outputting a multi-input signal is unnecessary in the dummy selector 177.

In the delay circuit row of the delay lock loop 175, the edge combiner 173 does not need signals outputted from the delay circuits at the post stages of the signal selected by the selector 176. This is because, since timing of the delay output signal S229 selected by the selector 176 is timing for stopping the intermittent operations of the mixers 120 and 121, it is unnecessary to output a pulse after the timing. Therefore, it is also possible to stop operations of the delay circuits at the post stages of the signal selected by the selector 176 and further reduce power consumption. It is also possible to add the selector 176 and the dummy selector 177 in FIG. 22 to the pulse generator 171 shown in FIG. 20.

Figure 23:
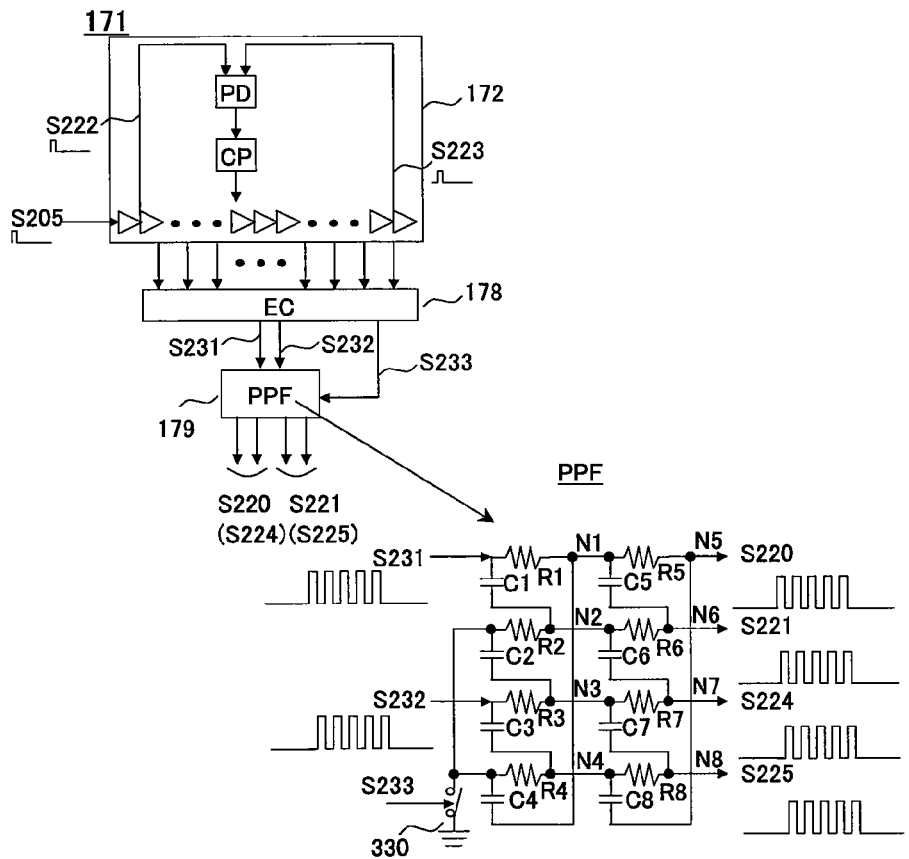
FIG. 23 is a block diagram showing still another structure of the pulse generator of the receiver for the UWB-IR radio communication shown in FIG. 19.

FIG. 23 is a block diagram showing still another structure of the pulse generator 171 of the receiver for the UWB-IR radio communication shown in FIG. 19. The pulse generator 171 in FIG. 23 includes the delay lock loop 172 of the pulse generator 171 shown in FIG. 20, the delay lock loop 172 substantially the same as the edge combiner 173, and an edge combiner 178 and also includes a polyphase filter 179. A difference in timing between pulse signals S231 and S232 generated by the edge combiner 178 of the pulse generator 171 shown in FIG. 23 corresponds to a difference in timing of 180° between the signals S220 and S224 of phases opposite to each other of the differential complementary local signals S220 (S224) and S221 (S225) of the pulse generator 171 shown in FIGS. 20, 21, and 22.

The polyphase filter 179 of the pulse generator 171 shown in FIG. 23 includes eight capacitors C1 to C8, eight resistors R1 to R8, and a switch 330. A control signal S233 from the edge combiner 178 is supplied to the switch 330, the pulse signal S231 from the edge combiner 178 is supplied to one end of the capacitor C1, and the pulse signal S232 from the edge combiner 178 is supplied to one end of the capacitor C3. During the operation period in the intermittent operations of the mixers 120 and 121, the switch 330 is controlled to be off according to the control signal S233 from the edge combiner 178. In respective circuit nodes N1 to N8 of the edge combiner 178, signal integration, signal differentiation, signal combination by capacitors and resistors are performed. The local signal S220 of a phase 0° is generated from the output node N5, the local signal S221 of a phase 90° is generated from the output node N6, the local signal S224 of a phase 180° is generated from the output node N7, and the local signal S225 of a phase 270° is generated from the output node N8. These differential complementary local signals S220 (S224) and S221 (S225) are supplied to the mixers 120 and 121. In the operation stop period in the intermittent operations of the mixers 120 and 121, the switch 330 is controlled to be on according to the control signal S233 from the edge combiner 178. Thus, all the local signals S220, S221, S224, and S225 from the output nodes N5, N6, N7, and N8 are set to an identical voltage.

A delay time difference among the plural delay output signals of the delay circuit row of the delay lock loop 172 of the pulse generator 171 shown in FIG. 23 can be set twice as large as a delay time difference of the pulse generator 171 shown in FIGS. 20, 21, and 22. In the pulse generator 171 shown in FIGS. 20, 21, and 22, the output signal of the edge combiner 173 is the local output signals S220 (S224) and S221 (S225) of the pulse generator 171. Thus, a delay time for generating a difference in timing between the local output signals S220 (S224) and S221 (S225) has to be added in the delay lock loops 172, 174, and 175.

On the other hand, in the pulse generator 171 shown in FIG. 23, a difference in timing between the local output signals S220 (S224) and S221 (S225) of the pulse generator 171 is generated by the polyphase filter 179. Therefore, the delay time added in the delay lock loop 172 is a delay time in which a difference in timing between the pulse signals S231 and S232 supplied to the polyphase filter 179 can be generated. Therefore, a delay time difference among the plural delay output signals of the delay circuit row of the delay lock loop 172 of the pulse generator 171 shown in FIG. 23 can be set twice as large as the delay time difference of the pulse generator 171 shown in FIGS. 20, 21, and 22. Therefore, it is possible to reduce the number of stages of the delay circuit row in the delay lock loop 172. Since accuracy of a delay time of the delay circuits is also relaxed, it is possible to further reduce power consumption.

The clock generator 171 shown in FIG. 23 is obtained by applying the polyphase filter 179 to the clock generator 171 shown in FIG. 20. However, it is also possible to apply the polyphase filter 179 to the clock generator 171 shown in FIG. 21 or FIG. 22.

The pulse generator 171 outputs the local output signals S220 (S224) and S221 (S225) in a period substantially equal to the operation period in the intermittent operations of the mixers 120 and 121. However, it is possible to set a period in which the pulse generator 171 outputs local output signals shorter or longer than the operation period in the intermittent operations of the mixers 120 and 121. In other words, it is recommended to appropriately set a period in which the pulse generator 171 outputs local output signals according to a stabilization time of the pulse generator 171 or a propagation delay time until the local output signals of the pulse generator 171 are supplied to the mixers 120 and 121.

In the receivers for the UWB-IR radio communication according to the first to third embodiments of the present invention, the circuit that supplies the local output signals S220 (S224) and S221 (S225) to the mixers 120 and 121 is constituted by the phase lock loop (PLL) 170 in which an intermittent operation is difficult and power consumption is large. On the other hand, in the receiver for the UWB-IR radio communication according to the fourth embodiment of the present invention, the circuit that supplies the local output signals S220 (S224) and S221 (S225) to the mixers 120 and 121 is constituted by the pulse generator 171 in which an intermittent operation is easy and it is possible to reduce power consumption in the operation stop period. Therefore, it is possible to further reduce power consumption without deteriorating reception performance. When a polyphase filter is used in the pulse generator 171, it is possible to reduce the number of stages of the delay circuit row of the delay lock loop and further reduce power consumption.

Fifth Embodiment

Figure 24:
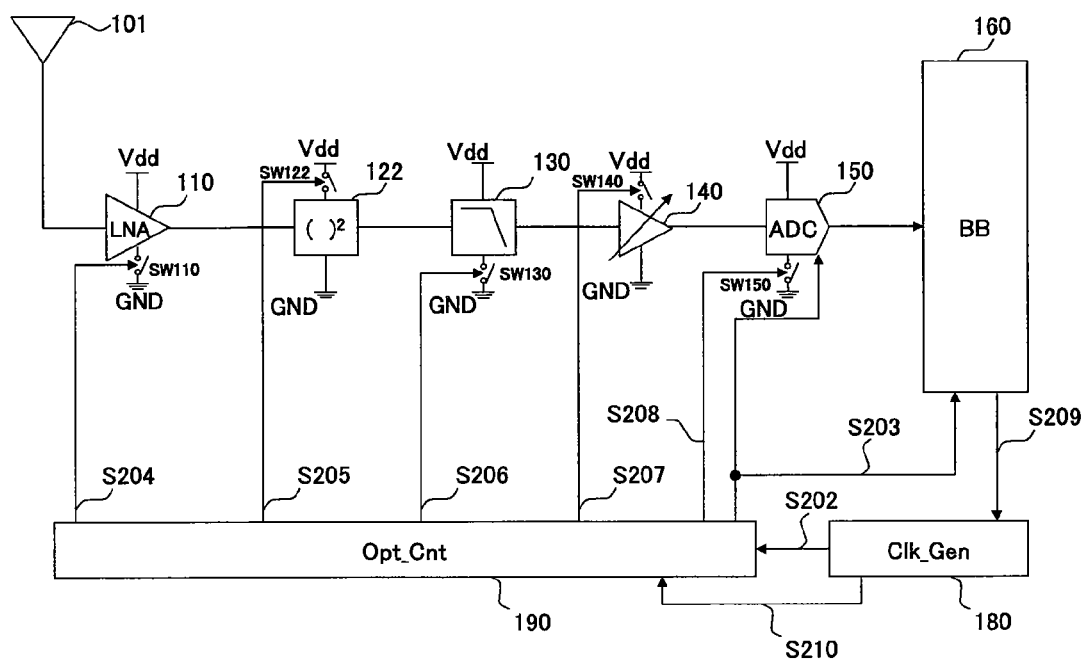
FIG. 24 is a block diagram showing an example of a structure of a receiver for the UWB-IR radio communication according to a fifth embodiment of the present invention.

FIG. 24 is a block diagram showing an example of a structure of a receiver for the UWB-IR radio communication according to a fifth embodiment of the present invention. Explanations of components common to the first, second, third, and fourth embodiments described above are omitted.

As a characteristic of the receiver for the UWB-IR radio communication according to the fifth embodiment of the present invention shown in FIG. 24, whereas the analog baseband signal S212 supplied to the low-pass filters 130 and 131 is formed by the mixers 120 and 121 in the embodiments described above, an analog baseband signal supplied to the low-pass filter 130 is formed by a square demodulator 122 in the receiver shown in FIG. 24.

Therefore, the receiver according to the fifth embodiment includes the reception antenna 101, the low noise amplifier 110, the square demodulator 122, the low-pass filter 130, the variable gain amplifier 140, the analog-to-digital converter 150, the baseband processing unit 160, the clock generating unit 180, and the operation-timing control unit 190. The structure of the receiver for the UWB-IR radio communication shown in FIG. 24 is only an example. It is possible to add filers, amplifiers, and the like among the stages of the circuits at the respective stages or delete a part of the circuits. Even in this case, it is possible to reduce power consumption by performing intermittent operations in the circuits at the respective stages. It is also possible to add a band-pass filter at a pre-stage or a post stage of the low noise amplifier 110 or add a variable gain amplifier at a pre-stage of the square demodulator 122. In that case, it is also possible to delete the variable gain amplifier 140 at a pre-stage of the analog-to-digital converter 150.

An impulse reception signal received by the reception antenna 101 is amplified by the low noise amplifier 110 and, then, squared by the square demodulator 122. Thereafter, an analog baseband signal in a desired signal band is extracted from the impulse reception signal by the low-pass filer 130. The impulse reception signal is amplified to a predetermined level by the variable gain amplifier 140 and, then, converted into a digital baseband signal by the analog-to-digital converter 150. These circuits at the respective stages perform intermittent operations by performing on and off operations of the switches SW110, SW122, SW130, SW140, and SW150 according to the intermittent operation control signals S204, S205, S206, S207, and S208 from the operation-timing control unit 190.

The square demodulator 122 of the receiver for the UWB-IR radio communication according to the fifth embodiment of the present invention shown in FIG. 24 can be realized by a Gilbert cell having a circuit configuration identical with that of the mixers 120 and 121 used in the embodiments described above. As it is well known, the Gilbert cell can also operate as a mixer and can also operate as an analog multiplier. By commonly supplying an impulse amplification signal from the output of the low noise amplifier 110 to two analog input terminals of the square demodulator 122 and the Gilbert cell as the analog multiplier, an output signal proportional to a square of an impulse amplification signal is formed. Since the common impulse amplification signal is supplied to the two analog input terminals of the square demodulator 122 and the Gilbert cell as the analog multiplier, this receiver is not a coherent receiver that synchronizes phases like the receivers according to the embodiments described above but is a non-coherent receiver that detests energy of an impulse reception signal and restores reception data.

In the receiver for the UWB-IR radio communication according to the fifth embodiment of the present invention shown in FIG. 24, compared with the receivers according to the embodiments described above, it is possible to reduce the number of circuits and a reduction in power consumption is realized. The baseband processing unit 160 controls timing of the output signal S202 of the clock generating unit 180 on the basis of a digital baseband signal of the output of the analog-to-digital converter 150 and generates the intermittent operation control signals S204, S205, S206, S207, and S208 of the circuits at the respective stages. Consequently, the reduction in power consumption is realized.

The invention devised by the inventors has been specifically explained on the basis of the embodiments. However, the present invention is not limited to the embodiments. It goes without saying that various modifications are possible without departing from the spirit of the invention.

For example, the low-pass filters (LPF) 130 and 131 for sufficiently reducing an interfering signal level of a 1 GHz spurious interfering signal generated by the 5 GHz wireless LAN are not limited to a high-order filter including a large number of operational transconductance amplifiers and a large number of capacitors. It is possible to use a high-order active filter including operational amplifiers and capacitors and a high-order active filter obtained by emulating an inductor with a gyrator (a negative inductance circuit) and a capacitor.

What is claimed is:
1. A receiver comprising:
a low noise amplifier that amplifies an impulse signal discretely transmitted;
a demodulator connected to an output of the low noise amplifier;
a low-pass filter connected to an output of the demodulator;
an analog-to-digital converter that converts an analog baseband signal extracted from an output of the low-pass filter into a digital baseband signal; and
an operation-timing control unit connected to the low noise amplifier, the demodulator, the low-pass filter, and the analog-to-digital converter, wherein the low-pass filter is constituted by an active filter including active amplifiers adapted to have a predetermined frequency characteristic to transmit the analog baseband signal of the output of the demodulator and to suppress an interfering signal having a frequency higher than that of the analog baseband signal, and wherein, in response to the reception of the impulse signal in a reception period of the impulse signal, the operation-timing control unit executes intermittent operation control for controlling the low noise amplifier, the demodulator, the low-pass filter, and the analog-to-digital converter to be in an operation state in the reception period of the impulse signal and, in a non-reception period of the impulse signal, for controlling the low noise amplifier, the demodulator, the low-pass filter, and the analog-to-digital converter to be in a non-operation state.

2. The receiver according to claim 1,
wherein, when the reception period of the impulse signal transitions to the non-reception period of the impulse signal, the operation-timing control unit controls the low-pass filter to be in the operation state during a total time of a delay time of the low-pass filter corresponding to the predetermined frequency characteristic of the low-pass filter and a time width of a pulse width of the impulse signal.

3. The receiver according to claim 2,
wherein, when the reception period of the impulse signal transitions to the non-reception period of the impulse signal, the operation-timing control unit controls the analog-to-digital converter to be in the operation state at least during a period of the time width of the pulse width of the impulse signal after an elapse of the delay time of the low-pass filter.

4. The receiver according to claim 1,
wherein the impulse signal is an impulse signal generated by ultra wideband impulse radio communication, a frequency spectrum of the impulse signal is an ultra-high frequency band signal with a center frequency of about 4 GHz and a frequency band of about 500 MHz, and the interfering signal having a frequency higher than that of the analog baseband signal is a spurious interfering signal of about 1 GHz generated by a 5 GHz wireless LAN.

5. The receiver according to claim 4,
wherein the low-pass filter is constituted by a high-order active filter including plural active amplifiers and plural capacitors.

6. The receiver according to claim 4, further comprising a baseband processing unit that processes the digital baseband signal output by the analog-to-digital converter and a clock generating unit that generates a clock signal, the clock generating unit being controlled by the baseband processing unit,
wherein the baseband processing unit performs synchronous acquisition of the impulse signal on the basis of preamble data in the digital baseband signal, the preamble data being transferred before transfer of payload data in the ultra wideband impulse radio communication,
wherein the clock generating unit generates the clock signal in synchronization with the preamble data after the synchronous acquisition by the baseband processing unit is completed, and
wherein the operation-timing control unit generates intermittent operation control signals to be supplied to the low noise amplifier, the demodulator, the low-pass filter and the analog-to-digital converter on the basis of the clock signal.

7. The receiver according to claim 6,
wherein the demodulator is constituted by a mixer or a square demodulator.

8. A receiver comprising:
a low noise amplifier that amplifies an impulse signal discretely transmitted;
a demodulator connected to an output of the low noise amplifier;
a low-pass filter, constituted by a high-order active filter including plural active amplifiers and plural capacitors, the low-pass filter being connected to an output of the demodulator;
an analog-to-digital converter that converts an analog baseband signal extracted from an output of the low-pass filter into a digital baseband signal; and
an operation-timing control unit connected to the low noise amplifier, the demodulator, the low-pass filter, and the analog-to-digital converter,
wherein the low-pass filter has a predetermined frequency characteristic to transmit the analog baseband signal of the output of the demodulator and to suppress an interfering signal having a frequency higher than that of the analog baseband signal,
wherein, in response to the reception of the impulse signal in a reception period of the impulse signal, the operation-timing control unit executes intermittent operation control for controlling the low noise amplifier, the demodulator, the low-pass filter, and the analog-to-digital converter to be in a operation state in the reception period of the impulse signal and, in a non-reception period of the impulse signal, for controlling the low noise amplifier, the demodulator, the low-pass filter, and the analog-to digital converter to be in a non-operation state,
wherein the impulse signal is an impulse signal generated by ultra wideband impulse radio communication, a frequency spectrum of the impulse signal is an ultra-high frequency band signal with a center frequency of about 4 GHz and a frequency band of about 500 MHz, and the interfering signal having a frequency higher than that of the analog baseband signal is a spurious interfering signal of about 1 GHz generated by a 5 GHz wireless LAN,
wherein the low noise amplifier, the demodulator, the low-pass filter, and the analog-to-digital converter constitute a serial connection circuit, and
wherein a switch that controls an intermittent operation of electronic circuits at odd number stages of the serial connection circuit is connected to one of a power supply voltage side and a ground voltage side and a switch that controls an intermittent operation of electronic circuits at even number stages of the serial connection circuit is connected to the other of the power supply voltage side and the ground voltage side.

9. A receiver comprising:
a low noise amplifier that amplifies an impulse signal discretely transmitted;
a demodulator connected to an output of the low noise amplifier;
a low-pass filter connected to an output of the demodulator;
a variable gain amplifier connected to an output of the low-pass filter;
an analog-to-digital converter that converts an analog baseband signal of an output of the variable gain amplifier into a digital baseband signal; and
an operation-timing control unit connected to the low noise amplifier, the demodulator, the low-pass filter, the variable gain amplifier, and the analog-to-digital converter, wherein, when a reception signal level of the impulse signal is low, a bias current of the variable gain amplifier is increased, whereby an amplification gain of the variable gain amplifier is increased, and wherein, in response to the reception of the impulse signal in a reception period of the impulse signal, the operation-timing control unit executes intermittent operation control for controlling the low noise amplifier, the demodulator, the low-pass filter, the variable gain amplifier, and the analog-to-digital converter to be in an operation state in the reception period of the impulse signal and, in a non-reception period of the impulse signal, for controlling the low noise amplifier, the demodulator, the low-pass filter, the variable gain amplifier, and the analog-to-digital converter to be in a non-operation state.

10. The receiver according to claim 9, wherein the low-pass filter is constituted by an active filter including active amplifiers adapted to have a predetermined frequency characteristic to transmit the analog baseband signal output by the demodulator and to suppress an interfering signal having a frequency higher than that of the analog baseband signal.

11. The receiver according to claim 10, wherein, when the reception period of the impulse signal transitions to the non-reception period of the impulse signal, the operation-timing control unit controls the low-pass filter to be in the operation state during a total time of a delay time of the low-pass filter corresponding to the predetermined frequency characteristic of the low-pass filter and a time width of a pulse width of the impulse signal.

12. The receiver according to claim 11, wherein, when the reception period of the impulse signal transitions to the non-reception period of the impulse signal, the operation-timing control unit controls the analog-to-digital converter to be in the operation state at least during a period of the time width of the pulse width of the impulse signal after an elapse of the delay time of the low-pass filter.

13. The receiver according to claim 10, wherein the impulse signal is an impulse signal generated by ultra wideband impulse radio communication, a frequency spectrum of the impulse signal is an ultra-high frequency band signal with a center frequency of about 4 GHz and a frequency band of about 500 MHz, and the interfering signal having a frequency higher than that of the analog baseband signal is a spurious interfering signal of about 1 GHz generated by a 5 GHz wireless LAN.

14. The receiver according to claim 13, wherein the low-pass filter is constituted by a high-order active filter including plural active amplifiers and plural capacitors.

15. The receiver according to claim 13, further comprising a baseband processing unit that processes the digital baseband signal output by the analog-to-digital converter and a clock generating unit that generates a clock signal, the clock generating unit being controlled by the baseband processing unit, wherein the baseband processing unit performs synchronous acquisition of the impulse signal on the basis of preamble data in the digital baseband signal, the preamble data being transferred before transfer of payload data in the ultra wideband impulse radio communication, wherein the clock generating unit generates the clock signal in synchronization with the preamble data after the synchronous acquisition by the baseband processing unit is completed and, wherein the operation-timing control unit generates intermittent operation control signals to be supplied to the low noise amplifier, the demodulator, the low-pass filter and the analog-to-digital converter on the basis of the clock signal generated from the clock generating unit after the synchronous acquisition by the baseband processing unit is completed.

16. The receiver according to claim 15, wherein the demodulator is constituted by a mixer or a square demodulator.

17. A receiver comprising:

a low noise amplifier that amplifies an impulse signal discretely transmitted;

a demodulator connected to an output of the low noise amplifier;

a low-pass filter, constituted by a high-order active filter including plural active amplifiers and plural capacitors, the low-pass filter being connected to an output of the demodulator;

a variable gain amplifier connected to an output of the low-pass filter;

an analog-to-digital converter that converts an analog baseband signal of an output of the variable gain amplifier into a digital baseband signal; and an operation-timing control unit connected to the low noise amplifier, the demodulator, the low-pass filter, the variable gain amplifier, and the analog-to-digital converter, wherein, when a reception signal level of the impulse signal is low, a bias current of the variable gain amplifier is increased, whereby an amplification gain of the variable gain amplifier is increased, wherein, in response to the reception of the impulse signal in a reception period of the impulse signal, the operation-timing control unit executes intermittent operation control for controlling the low noise amplifier, the demodulator, the low-pass filter, the variable gain amplifier, and the analog-to-digital converter to be in an operation state in the reception period of the impulse signal and, in a non-reception period of the impulse signal, for controlling the low noise amplifier, the demodulator, the low-pass filter, the variable gain amplifier, and the analog-to-digital converter to be in a non-operation state, wherein the low-pass filter has a predetermined frequency characteristic to transmit the analog baseband signal output by the demodulator and to suppress an interfering signal having a frequency higher than that of the analog baseband signal, wherein the impulse signal is an impulse signal generated by ultra wideband impulse radio communication, a frequency spectrum of the impulse signal is an ultra-high frequency band signal with a center frequency of about 4 GHz and a frequency band of about 500 MHz, and the interfering signal having a frequency higher than that of the analog baseband signal is a spurious interfering signal of about 1 GHz generated by a 5 GHz wireless LAN, wherein the low noise amplifier, the demodulator, the low-pass filter, and the analog-to-digital converter constitute a serial connection circuit, and wherein a switch that controls an intermittent operation of electronic circuits at odd number stages of the serial connection circuit is connected to one of a power supply voltage side and a ground voltage side and a switch that controls an intermittent operation of electronic circuits at even number stages of the serial connection circuit is connected to the other of the power supply voltage side and the ground voltage side.

* * * * *